US012677296B2

(12) United States Patent
Handte et al.

(10) Patent No.: US 12,677,296 B2
(45) Date of Patent: Jul. 7, 2026

(54) COMMUNICATION DEVICES AND METHODS

(71) Applicant: Sony Group Corporation, Tokyo (JP)

(72) Inventors: Thomas Handte, Stuttgart (DE); Kosuke Aio, Stuttgart (DE); Dana Ciochina-Kar, Stuttgart (DE); Daniel Verenzuela, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 292 days.

(21) Appl. No.: 18/694,593

(22) PCT Filed: Sep. 26, 2022

(86) PCT No.: PCT/EP2022/076709
§ 371 (c)(1),
(2) Date: Mar. 22, 2024

(87) PCT Pub. No.: WO2023/052306
PCT Pub. Date: Apr. 6, 2023

(65) Prior Publication Data
US 2025/0151083 A1 May 8, 2025

(30) Foreign Application Priority Data

Sep. 29, 2021 (EP) ..................................... 21199830

(51) Int. Cl.
*H04W 72/232* (2023.01)
*H04B 7/024* (2017.01)
*H04L 1/1867* (2023.01)

(52) U.S. Cl.
CPC .......... *H04W 72/232* (2023.01); *H04B 7/024* (2013.01); *H04L 1/1896* (2013.01)

(58) Field of Classification Search
CPC .................. H04B 7/024; H04L 1/1896; H04L 2001/0093; H04L 2001/0097; H04W 72/232

(Continued)

(56) References Cited

U.S. PATENT DOCUMENTS

2022/0209825 A1* 6/2022 Chitrakar .............. H04W 28/02
2022/0271800 A1* 8/2022 Handte .................. H04B 7/024
2024/0056127 A1* 2/2024 Chitrakar .............. H04B 7/024

FOREIGN PATENT DOCUMENTS

WO 2020/231326 A1 11/2020
WO 2021/084010 A1 5/2021

OTHER PUBLICATIONS

International Search Report and Written Opinion mailed on Jan. 5, 2023, received for PCT Application PCT/EP2022/076709, filed on Sep. 26, 2022, 10 pages.

(Continued)

*Primary Examiner* — Robert J Lopata
(74) *Attorney, Agent, or Firm* — XSENSUS LLP

(57) ABSTRACT

Multiple access points (APs) that transmit jointly at the same time to one or more stations (STAs) need logically to be connected via a link, e.g. a backhaul link. The master AP creates physical layer input data units (PSDUs) to be transmitted during joint transmission and conveys it via the link to one or more slave APs. It may happen that a STA receives the PSDU or parts of it erroneously, in which case a retransmission takes place. A mechanism that allows to reuse the PSDU, which was conveyed by the master AP via the link to the slave AP for the initial transmission, for any subsequent retransmission. Thereby, the bandwidth requirement of the backhaul link is significantly lowered when retransmissions take place. In particular, the difficulty that the PSDU contents change within a retransmission is addressed.

20 Claims, 24 Drawing Sheets

(58) Field of Classification Search
USPC .......................................................... 370/329
See application file for complete search history.

(56) References Cited

OTHER PUBLICATIONS

"Part 11: Wireless LAN Medium Access Control(MAC) and Physical Layer (PHY) Specifications", IEEE Standards Association, IEEE 802.11-2016, Dec. 7, 2016, pp. 1-3532.

* cited by examiner

| MAP hdr | MPDU or A-MPDU or S-MPDU or PSDU |

Fig. 9 extract MPDU/A-MPDU — S201 transmit Ack — S202 extract control information — S203 storage — S204 prepare JTX — S205 transmit PPDU — S206

COMMUNICATION DEVICES AND METHODS

CROSS-REFERENCE TO RELATED APPLICATIONS

The present application is based on PCT filing PCT/EP2022/076709, filed Sep. 26, 2022, which claims priority to European Patent Application No. 21199830.7, filed Sep. 29, 2021, the entire contents of each are incorporated herein by reference.

BACKGROUND

Field of the Disclosure

The present disclosure relates to communication devices and methods, in particular for use in a multi access point (multi-AP) communication system.

Description of Related Art

As of today, in Wireless LANs (WLANs), an access point (AP) transmits one or more PPDUs (physical layer protocol data units) to one or more stations (STAs). Thereby, only a single AP should be transmitting at a point in time. Transmissions by other APs or STAs are interfering with that transmission and are therefore undesired. Next generation Wireless LAN considers joint transmission (JTX; also called "coordinated transmission" herein) of PPDUs by multiple APs (MAP) at the same time. The advantage is that coverage and/or reception quality can be increased.

Joint operation of multiple APs may particularly increase spectral efficiency beyond today's limits. Multiple APs perform JTX of a PPDU to the receiver, thereby increasing the number of spatial streams that can be conveyed to the receiver and the reliability of each spatial stream, too. In JTX each AP generally transmits data that originates from the same input data unit, for which reason a wired or wireless backhaul connection between the APs operating in JTX is used.

WO 2021/084010 A1 discloses an efficient backhaul operation that minimizes data rate requirements of the backhaul. Backhaul information is transmitted from a master AP to one or more slave APs for joint transmission from the one or more slave APs to an STA in coordination with a transmission from the master AP to the STA.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admit-ted as prior art against the present disclosure.

SUMMARY

It is an object to enable retransmissions in a multi-AP communication setup using joint transmission. It is a further object to provide corresponding communication devices as well as a corresponding computer program and a non-transitory computer-readable recording medium for implementing the communication methods.

According to an aspect there is provided a first communication device comprising circuitry configured to generate control information for one or more MAC output data units, the control information indicating that the one or more MAC output data units are to be physical (PHY) layer processed by the third communication device and to be transmitted to a second communication device from the third communication device and from the first communication device;

provide the one or more MAC output data units and the associated control information to the third communication device for generation of one or more PHY output data units and storage of the one or more MAC output data units for transmission and possibly required retransmission;

notify the third communication device of a coordinated transmission of the one or more MAC output data units by the first communication device and the third communication device;

generate one or more PHY output data units by performing PHY layer processing of the one or more MAC output data units for transmission to the second communication device from the first communication device in the coordinated transmission with the transmission of one or more PHY output data units generated by the third communication device from the one or more MAC output data units;

transmit the one or more PHY output data units generated from the one or more MAC output data units in the coordinated transmission;

notify the third communication device of a coordinated retransmission of one or more selected MAC output data units by the first communication device and the third communication device in case of a required retransmission; and transmit one or more PHY output data units generated from the one or more selected MAC output data units in the coordinated retransmission.

According to a further aspect there is provided a third communication device comprising circuitry configured to obtain one or more media access control (MAC) output data units and associated control information from a first communication device, the control information indicating that the one or more MAC output data units are to be physical (PHY) layer processed by the third communication device and to be transmitted to the second communication device from the third communication device and from the first communication device;

store the one or more MAC output data units for transmission and possibly required retransmission until a coordinated retransmission is finished or a predetermined condition is fulfilled;

generate PHY output data units by performing PHY layer processing of the one or more MAC output data units for transmission to the second communication device from the third communication device in a coordinated transmission with the transmission of one or more PHY output data units generated by the first communication device from the one or more MAC output data units;

transmit the one or more PHY output data units in the coordinated transmission in response to a notification from the first communication device notifying the third communication device of the coordinated transmission of the one or more MAC output data units by the first communication device and the third communication device; and transmit one or more PHY output data units generated from one or more selected MAC output data units in a coordinated retransmission in response to a notification from the first communication device notifying the third communication device of a coordinated retransmission of the one or more selected MAC output data units by the first communication device and the third communication device in case of a required retransmission.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed communication method and as defined in the dependent claims and/or disclosed herein.

One of the aspects of the disclosure is to define a mechanism that allows to reuse the data units that have been conveyed from a master AP (also called "first communication device" herein) to one or more slave APs (also called "third communication device" herein) for the initial transmission, for any subsequent joint retransmission from the master AP and one or more slave APs to a station (generally called non-AP STA or simply STA; also called "second communication device" herein).

A link, such as a backhaul link, is preferably provided and used to transport the necessary information from the master AP to the one or more slave APs participating in a joint transmission before the actual joint transmission takes place. The same backhaul link is used for providing information regarding a later retransmission to the one or more slave APs. The bandwidth requirement of the backhaul link is significantly lowered according to the present disclosure when retransmissions take place since MAC output data units are not transmitted to the one or more slave APs for the retransmission, but the stored MAC output data units are used within the one or more slave APs.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 9 shows a diagram illustrating a MAP-MSDU.

DETAILED DESCRIPTION OF THE EMBODIMENTS

WO 2021/084010 A1, the description of which is herein incorporated by reference, discloses a PSDU-based backhaul operation which is summarized in the following before details of the present disclosure are described. One or more elements of WO 2021/084010 A1 may be used according to the present disclosure as well.

As of today, in any wireless LAN, an access point (AP) transmits one or more PPDUs (physical layer protocol data units) to one or more stations (STAs). Thereby, only a single AP is transmitting at a point in time. Transmissions by other APs or STAs are interfering with that transmission and are therefore undesired.

In contrast, next generation Wireless LAN considers joint transmission (JTX) of a PPDU by multiple APs (MAP) at the same time. The advantage is that coverage and/or reception quality are increased. As a disadvantage, there is a need for synchronization between APs and advanced channel sounding. A further important aspect for MAP is that information needs to be shared among the APs that transmit simultaneously in MAP setup.

Figures 1, 2:
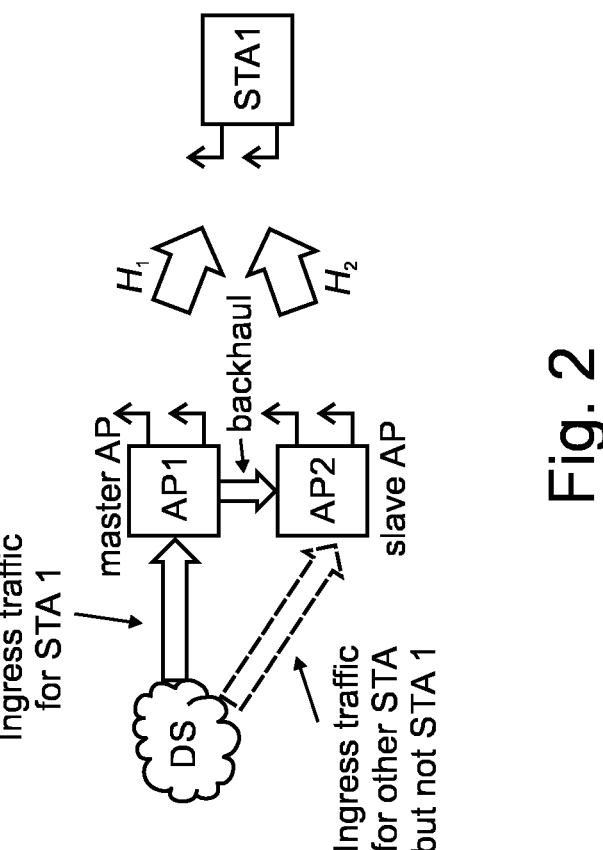
FIG. 1 shows a schematic diagram of a conventional communication system.
FIG. 2 shows a schematic diagram of the layout of a communication system in which the present disclosure may be applied.
Figure 3:
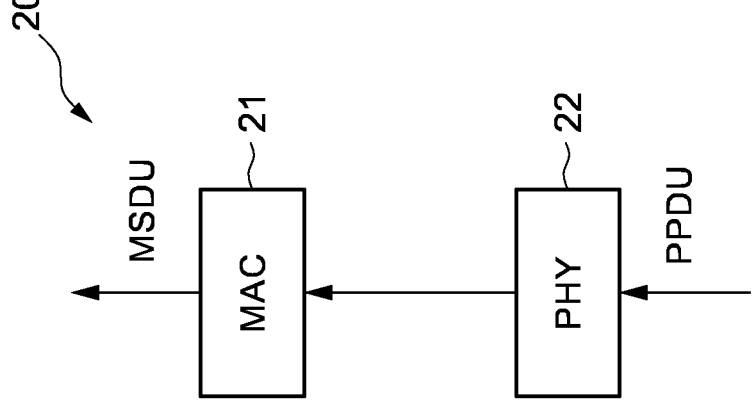
FIG. 3 shows the general layout of a communication device operating as AP and a communication device operating as STA.
Figure 3:
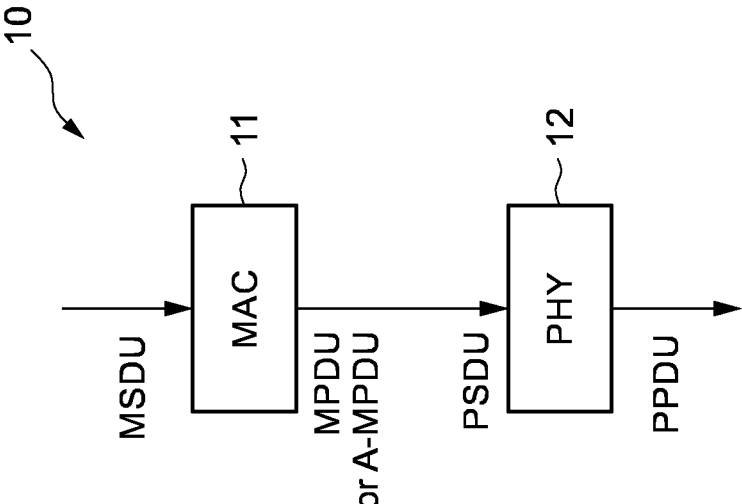

In the following, a brief overview of the system model will be given. FIG. 1 shows a system using MAP data transmission from two APs to one STA, i.e. the setup resembles a down-link scenario. Each AP as well as each STA may have multiple transmit or receive antennas, respectively. The channel transfer function from AP1 to STA1 is $H_1$, whereas $H_2$ is the channel transfer function from AP2 to STA1. Note that both $H_1$ and $H_2$ are matrices, which are in the most general case a function of carrier or tone index, i.e. the channel can be modeled by a set of matrices. In addition, both matrices may change with time but this is not considered here, as it is assumed that a channel matrix is known to at least the respective AP with good accuracy.

The receive signal r at STA1 (for a particular carrier or tone) is $$r = [H_1 \quad H_2] \cdot \begin{pmatrix} t_1 \\ t_2 \end{pmatrix}$$

in which $t_1$ and $t_2$ denote the actual transmit signal of a respective AP. Each AP may perform a precoding with matrix $Q_1$ or $Q_2$, respectively. Thus, the received signal r is $$r = [H_1 Q_1 \quad H_2 Q_2] \cdot s$$

with $$Q = \begin{pmatrix} Q_1 \\ Q_2 \end{pmatrix}$$

being the overall precoding matrix and s being the baseband transmit signal before precoding. In the model above, the transmit signal, receive signal, channel matrix, and precoding matrix are carrier-based. An OFDM system is assumed, where each OFDM symbol conveys the information to be transmitted on one or more subcarriers or tones. The transmit signal may consist of one or more OFDM symbols.

In the most general case, vector s has dimensions $N_{SS} \times 1$ with $N_{SS}$ denoting the number of spatial streams in JTX. $Q_i$ has dimensions $N_{TX,i} \times N_{SS}$ with $N_{TX,i}$ denoting the number of transmit chains or transmit antennas of AP i. $H_i$ has dimensions of $N_{RX} \times N_{TX,i}$ with $N_{RX}$ denoting the number of receive antennas of STA1. The model presented here assumes a single receiver; however, it can be easily extended to a multi-user (MU) scenario. In MU context, MAP serves several STAs at the same time.

In the following, it is assumed that the data traffic ingresses at a single AP as shown in FIG. 2 illustrating a communication system in which the present disclosure may be applied. It has a master AP (AP1; generally also called first communication device herein) and a slave AP (AP2; generally also called third communication device herein; there may be further slave APs) serving a station (STA1; generally a second communication device).

Thus, the (user) data to be transmitted to the STA enters one AP (the master AP) only. All other APs that participate in a JTX are referred to as slave APs. As will be explained in more detail below, backhaul information is transmitted from the master AP to one or more slave APs for joint transmission from the one or more slave APs to a STA in coordination with a transmission from the master AP to the STA.

The distribution system (DS), which may be an external entity, such as a router, a server, a network, etc., is a connection to a higher layer, which provides a source of ingress traffic and a sink for egress traffic from an AP perspective. It is the objective of the DS to deliver a MAC service data unit (MSDU) to the intended destination. The DS may contain wireline and/or even further wireless links. It should be noted that master AP and slave AP provide egress traffic to the DS as well, but this is not primarily addressed herein.

As can be seen from the equation above, the master AP (e.g. AP1) may generate s based on the ingress traffic, but AP2 cannot generate s because it is not aware of the data to be sent to STA1. Means are provided to convey the necessary information from the master AP to one or more slave APs so that they can generate s.

According to embodiments, two ways to provide the one or more MAC output data units and the associated control information to the slave AP(s), namely via wireless backhaul or via DS backhaul, are provided, i.e. the slave APs are connected via a (e.g. wired) link to the master AP or via wireless backhaul (i.e. the slave APs are wirelessly connected to the master AP). The wireless connection may use the same frequency band as the successive JTX or a different frequency band. Moreover, embodiments of how the JTX is initiated or triggered after the necessary information has been conveyed to the slave APs are presented. Generally, embodiments of the proposed solutions are very efficient in terms of required bit rate of the backhaul, because they provide only MAC layer information to the slave AP(s) instead of full PHY layer information.

Before going to the details of MAP, the general operation of WLAN shall be briefly described by reference to showing the general layout of a communication device 10 operating as AP and of a communication device 20 operating as STA. The communication device 10 comprises a MAC (media access control) unit 11 (also called MAC layer unit or MAC layer circuitry or simply MAC layer) and a PHY (physical) unit 12 (also called PHY layer unit or PHY layer circuitry or simply PHY layer). The communication device 20 comprises a MAC unit 21 and a PHY unit 22 as well. All these units may e.g. be implemented by respective circuitry, a processor or computer.

Generally, the MAC unit 11 processes any incoming MSDU (herein also called MAC input data unit) in several steps. The main steps may be as follows. First, the MAC unit 11 buffers an incoming MSDU in one or more queues depending on its priority. Once the wireless channel is free for a certain period of time, the MAC unit 11 starts processing one or more MSDUs: The MAC unit 11 encrypts user data (i.e. one or more MSDU), prepends a MAC header and appends a frame check sequence (FCS). This forms a MPDU (herein also called MAC output data unit). The MAC header contains control information for the MAC unit of the peer STA 20 such as type of frame, duration, source and destination (MAC) address, and sequence number. The FCS is used by the MAC unit 21 of the peer STA 20 to detect if the MSDU or the MAC header has been received in error (and to potentially request a retransmission).

In a next step, one MPDU or several MPDUs are aggregated to an A-MPDU, which forms the physical layer service data unit (PSDU; herein also called PHY input data unit). The MAC unit 11 forwards the PSDU to the PHY unit 12, which encodes, modulates and transmits the MAC message (either MPDU or A-MPDU), i.e. the PSDU. To enable the PHY unit 22 of the peer STA 20 to demodulate a received PHY output data unit, the PHY unit 12 prepends a PHY preamble holding PHY configuration and channel estimation sequences. The finally obtained PPDUs (PHY output data units) are transmitted to the STA 20.

The PHY unit 22 of the STA 20 receives the PPDUs and performs inverse PHY layer processing followed by inverse MAC layer processing by the MAC unit 21 to obtain the MSDUs, i.e. the original data provided to the AP for transmission to the STA.

The PHY unit 12 may combine MPDUs with different destination/receiver address in a (multi-user) MU-PPDU. In this case, orthogonal PHY layer resources such as OFDMA or MU-MIMO perform the separation of PSDUs with different destination/receiver address.

Figure 4:
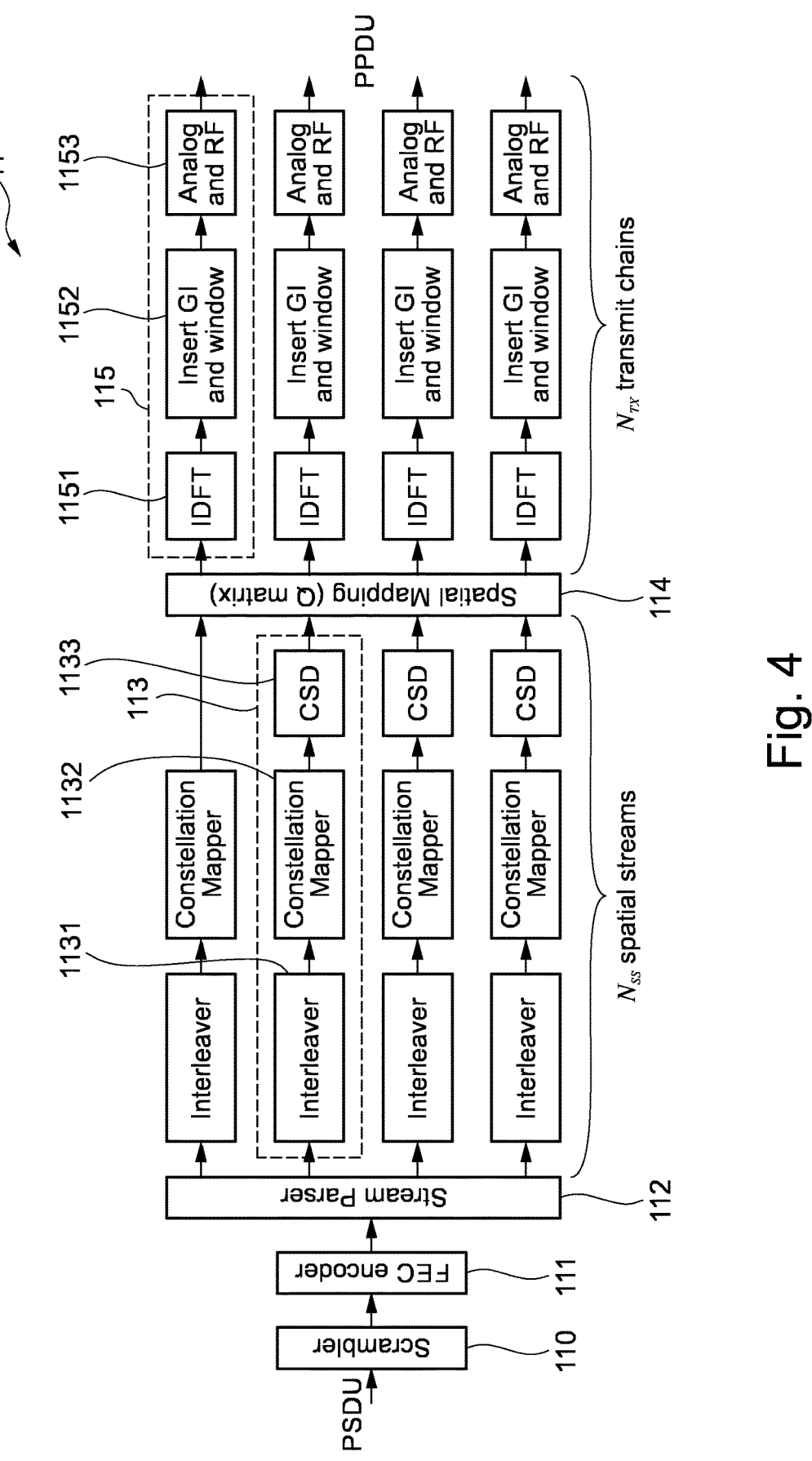
FIG. 4 shows a schematic diagram of an embodiment of a PHY unit of the AP.

FIG. 4 shows a schematic diagram of an embodiment of a PHY unit 12 of the AP 10. It includes a scrambler 110, a forward error correction (FEC) encoder 111, a stream parser 112, $N_{SS}$ spatial stream processing units 113 (each comprising an interleaver 1131, a constellation mapper 1132 and (except for the first stream) a cyclic shift delay (CSD) unit 1133), a spatial mapper 114 and NTX transmit chains 115 (each comprising an inverse discrete Fourier transform (IDFT) unit 1151, an insertion unit 1152 for inserting a guard interval (GI) and window and an analog and RF processing unit 1153). It should be noted that the PHY unit 22 of the STA 20 may generally be configured in the same manner.

Figure 5:
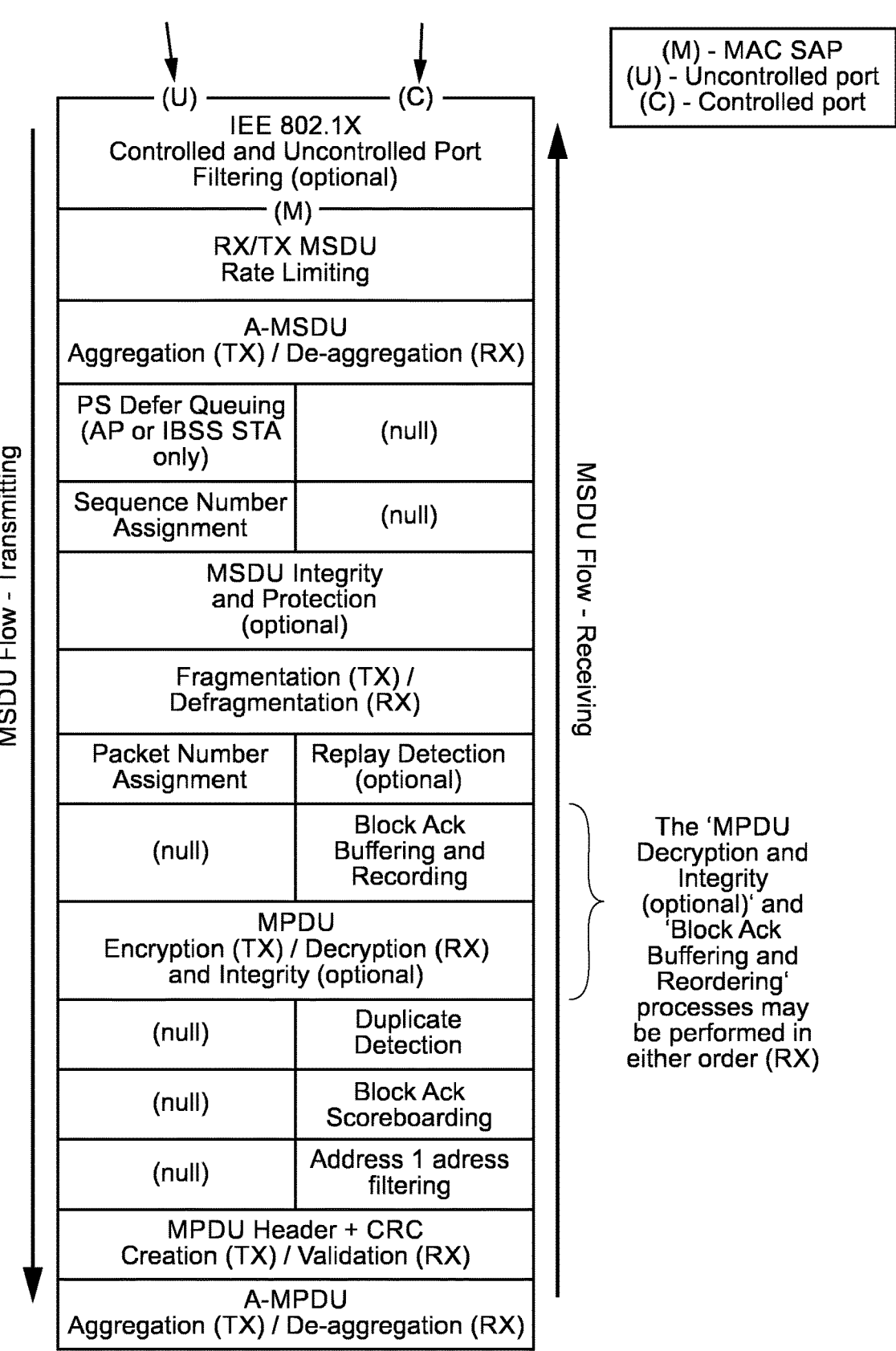
FIG. 5 shows a diagram illustrating MAC operation for transmission and reception.
Figure 6:
FIG. 6 shows a diagram illustrating the relationships between MSDU, A-MSDU, MPDU, A-MPDU, PSDU and PPDU.

FIG. 5 shows a diagram illustrating MAC operation for transmission and reception included in MAC unit 11 or the MAC unit 21. FIG. 6 shows a diagram illustrating the relationships between MSDU, A-MSDU, MPDU, A-MPDU, PSDU and PPDU. Further details of these relationships and the general configuration and operation of MAC and PHY circuitry can e.g. be found in IEEE 802.11 standards.

The processing of a MSDU is different for MAP for both master AP and slave APs as will be explained below in detail.

Figure 7:
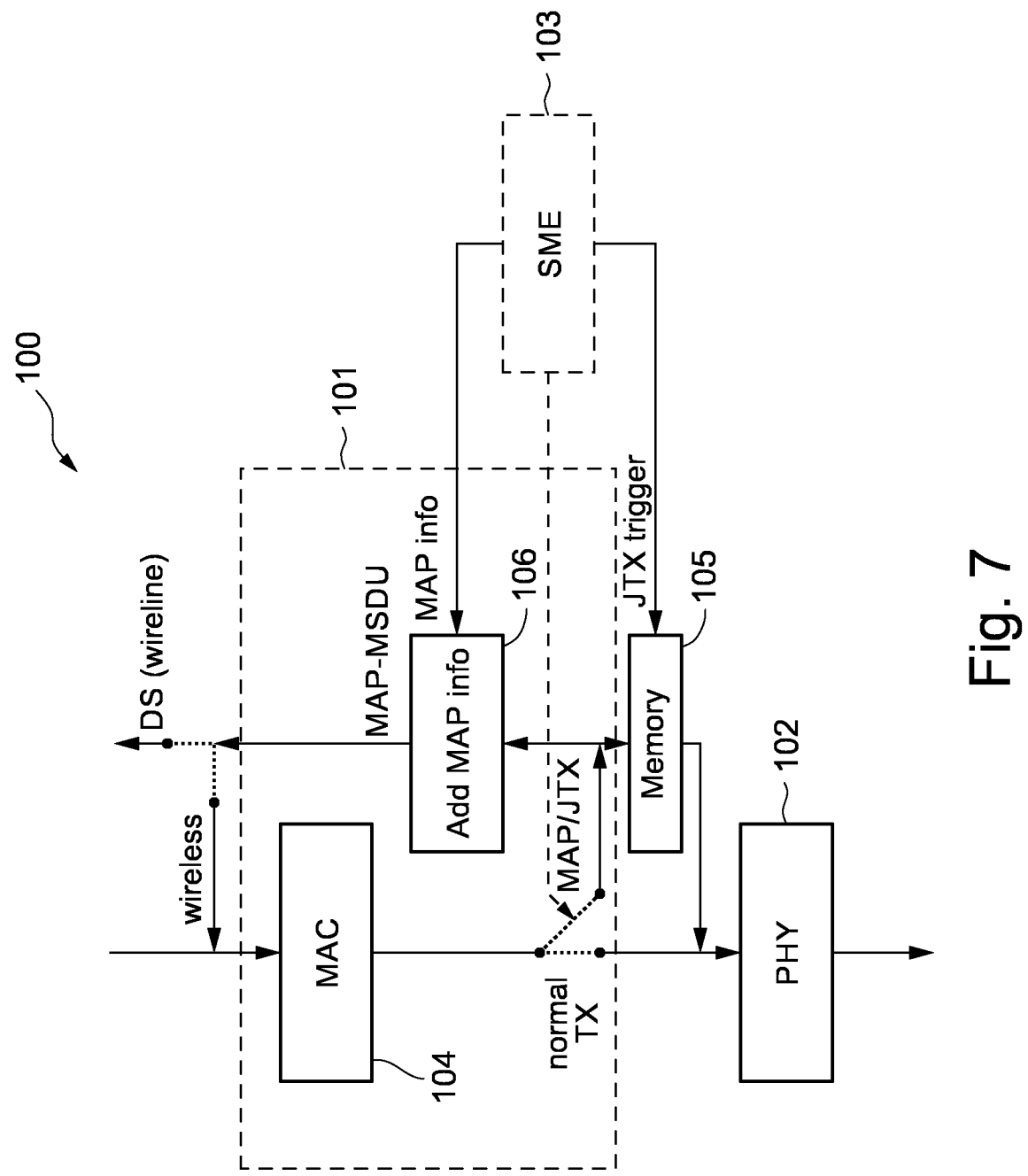
FIG. 7 shows a schematic diagram of a first communication device to illustrate its operation as master AP according to WO 2021/084010 A1.

FIG. 7 shows a schematic diagram of a first communication device 100 to illustrate its operation as master AP in JTX. The master AP 100 comprises a MAC unit 101 and a PHY unit 102. Once the master AP 100 receives a MSDU, it checks if that MSDU is MAP eligible, i.e. if it can be transmitted to a particular station both by the master AP and a slave AP in coordination, i.e. in a joint transmission (JTX). A MAP eligible MSDU thus is a MSDU which is part of a PPDU transmitted by a slave AP in a JTX. This check (or selection) can e.g. be accomplished by evaluating the destination and/or receiver address and/or user priority provided along with the MSDU. The categorization of MAP or non-MAP eligible MSDU may be done by an optional (internal or external) control unit 103 (e.g. station management entity, SME) or by any other entity of the master AP. The categorization may be done before or after MAC processing of MSDUs. If a MSDU is not MAP eligible, regular MAC and PHY processing is done.

It shall be noted that in an embodiment, at an earlier stage, the master AP may determine that joint transmission should be used (e. g. for transmission to one or more or all STAs) and a MAP mode should be entered (e. g. because joint transmission is beneficial regarding improved data rates or reliability). If the master AP is in that MAP mode, the eligibility check as described above may thus comprise or represent the step of selecting MSDU that shall be used in a JTX. In another embodiment the step of eligibility check and the selection step may be separate steps performed subsequently.

Figure 8:
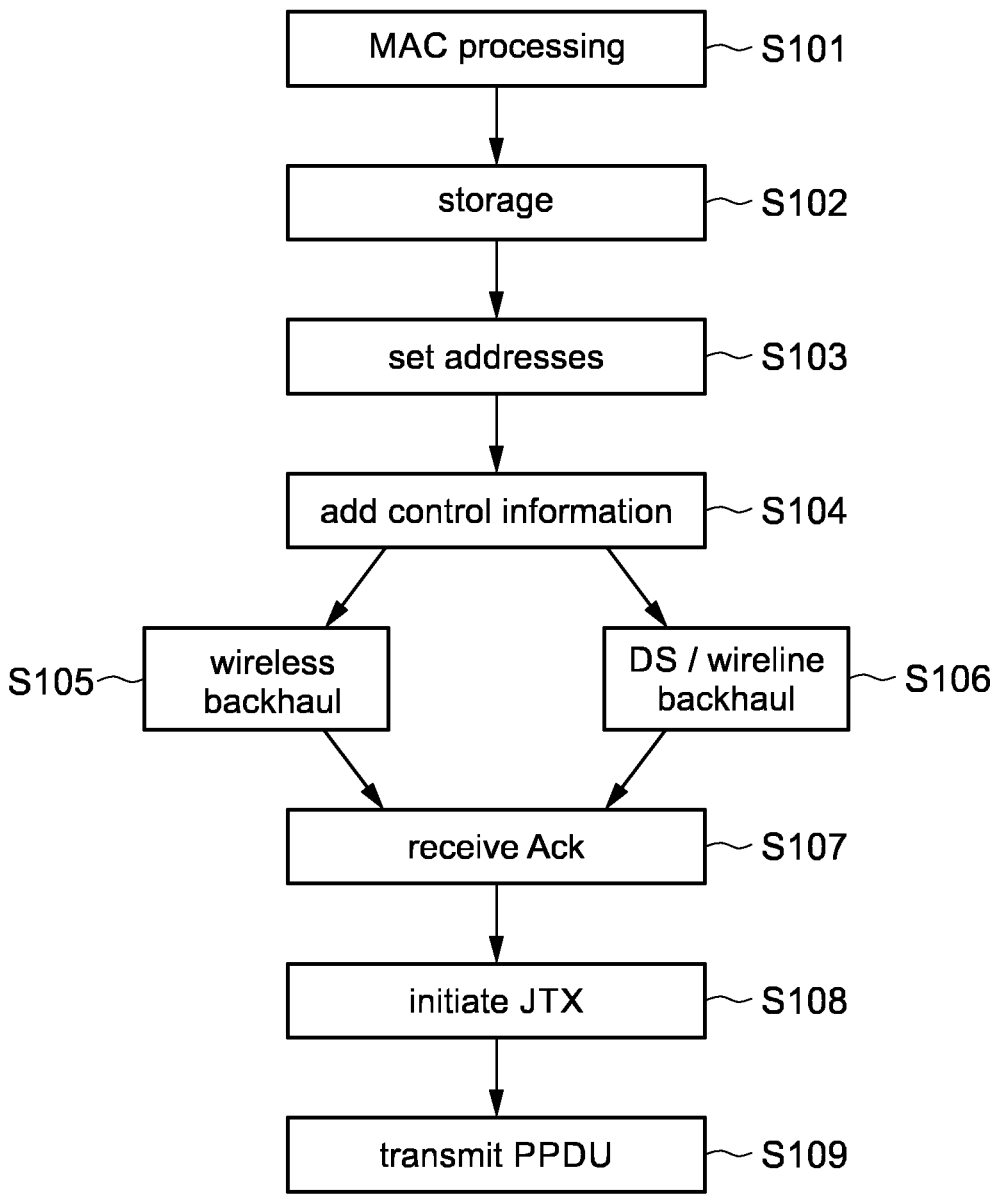
FIG. 8 shows a flowchart of the operation of the MAC unit of the master AP.

If the MSDU is MAP eligible, the MAC unit 101 may perform the following steps illustrated in the flowchart shown in FIG. 8.

Initially, MAC output data units are generated by performing MAC layer processing of MAC input data units to be transmitted to a STA. In particular, in a first step S101, the MAC unit 100 processes the MSDU (MAC input data unit) regularly, i.e. it performs steps such as encryption, MAC header and FCS addition as well as aggregation to an A-MPDU (this is indicated by the block 104 in FIG. 7). The output is either a MPDU or A-MPDU or S-MPDU (MAC output data unit). This MAC processing for MAP eligible MSDUs can be done although the channel is busy.

The master AP 100 stores (step S102) the MAC output data units that are selected for later transmission in the joint transmission (also called "MAC output data units") in a memory 105 (these are later the PSDU or at least part of it).

Subsequently, control information for one or more MAC output data units is generated. The control information indicates that the one or more MAC output data units are to be PHY layer processed by slave AP and to be transmitted to the STA from the slave AP and from the master AP.

In particular, in step S103, the MAC unit 101 interprets the MAC output data units (i.e. the MPDU or A-MPDU) as a new MSDU (called MAP-MSDU in the following) but sets source and destination address differently: The new source address is the master AP address (i.e. the address of the master AP 100) and the new destination address is the slave AP address (i.e. the address of a slave AP (200 and 300; see FIGS. 10 and 11).

Further, in step S104 the MAC unit 101 adds further control information to that MAP-MSDU, for instance a unique identifier. This can e.g. be another header, a MAP header or a MAP (control) frame. Details will be explained below in more detail. Steps 103 and 104 are performed in the block 106 in FIG. 7. The MAP information ("control information") may be provided by the control unit (e.g. the SME 103). In another embodiment, S103 and S104 may be combined, i.e. the addresses may be set in the control information.

Subsequently, the one or more MAC output data units and the associated control information are provided to the slave AP. In an embodiment using wireless backhaul, as provided in step S105, once the channel is free, the MAC unit 101 processes this MAP-MSDU regularly but considers the source-destination (e.g. master AP-slave AP) specific parameters such as MAC (e.g. encryption) and PHY (e.g. encoding, modulation) parameters and triggers the PHY unit 102 to process them to generate PHY output data units for transmission. Because source and destination address have changed, the PHY output data units (i.e. the corresponding MSDU) are transmitted to the slave AP (the third communication device) and not to the intended STA (the second communication device).

In another embodiment for providing the one or more MAC output data units and the associated control information are provided to the slave AP using DS or wireline backhaul, as provided in step S106, the MAC unit 101 provides the MAP-MSDU to a higher layer (DS) together with destination address (DA), source address (SA), and length information. Consequently, DA is set to slave AP, and SA is set to master AP. It is the objective of the DS to convey this information (i.e. the MAC output data units and the control information) to the slave AP.

The master AP 100 may await an acknowledgement (ACK) (step S107) indicating successful reception of one or more MAP-MSDUs and may even retransmit MAP-MSDUs if needed.

Once the master AP conveyed all MAP-MSDUs to all slave APs needed for a JTX, possibly having received an acknowledgement, the master AP 100 may decide to initiate a JTX in step S108. The master AP 100 thus sends announcement information (an announcement frame) to all slave APs including at least the unique identifiers of the MAP-MSDUs that are going to be jointly transmitted in the following. Additionally, PHY layer configuration data may be added and spatial mapping matrices Q may be indicated (details will be explained below).

The master AP 100 then transmits in step S109 a PPDU with the PSDU(s) saved in step S102, either after a predefined time after the announcement information (frame) transmitted in step S107 has been transmitted or following a trigger transmitted by the master AP 100 to the slave APs. This is illustrated in FIG. 7 by the JTX trigger that may be provided by the control unit (e.g. the SME 103). It shall be noted that the announcement and the JTX may be transmitted separately or the information may be combined into a combined trigger.

It shall be noted that MSDUs may exist, which are to be transmitted by a master AP in a JTX and are not MAP eligible. These MSDUs may be stored in a memory at the master AP until the JTX starts. Conceptually, these can be stored either in the memory 105 or in memories, which are contained in the MAC unit 101 anyway, e.g. in a transmit queue.

Figure 9:
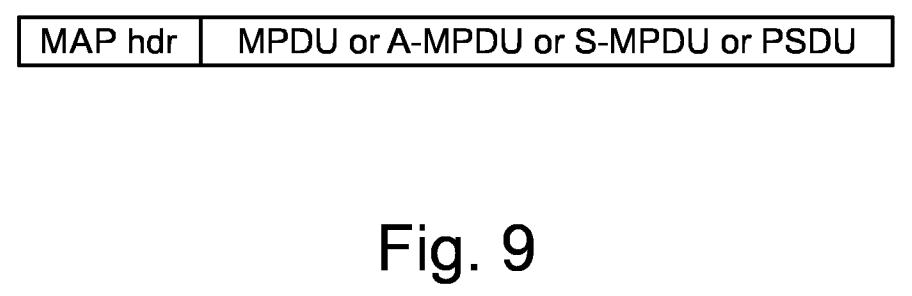

FIG. 9 shows a diagram illustrating a MAP-MSDU. A MAP-MSDU comprises a header that holds control information or information related to the data part. The data part contains all or a fraction of the PSDU that is going to be transmitted in JTX. Therefore, it may comprise an MPDU, an S-MPDU, an A-MPDU, or a PSDU. A S-MPDU is a single MPDU within an A-MPDU subframe. The S-MPDU has a slightly different content within a first delimiter (DEL; see also FIG. 17). Each of the MPDU, A-MPDU and S-MPDU may generally be understood as "MAC output data unit" herein.

Figure 10:
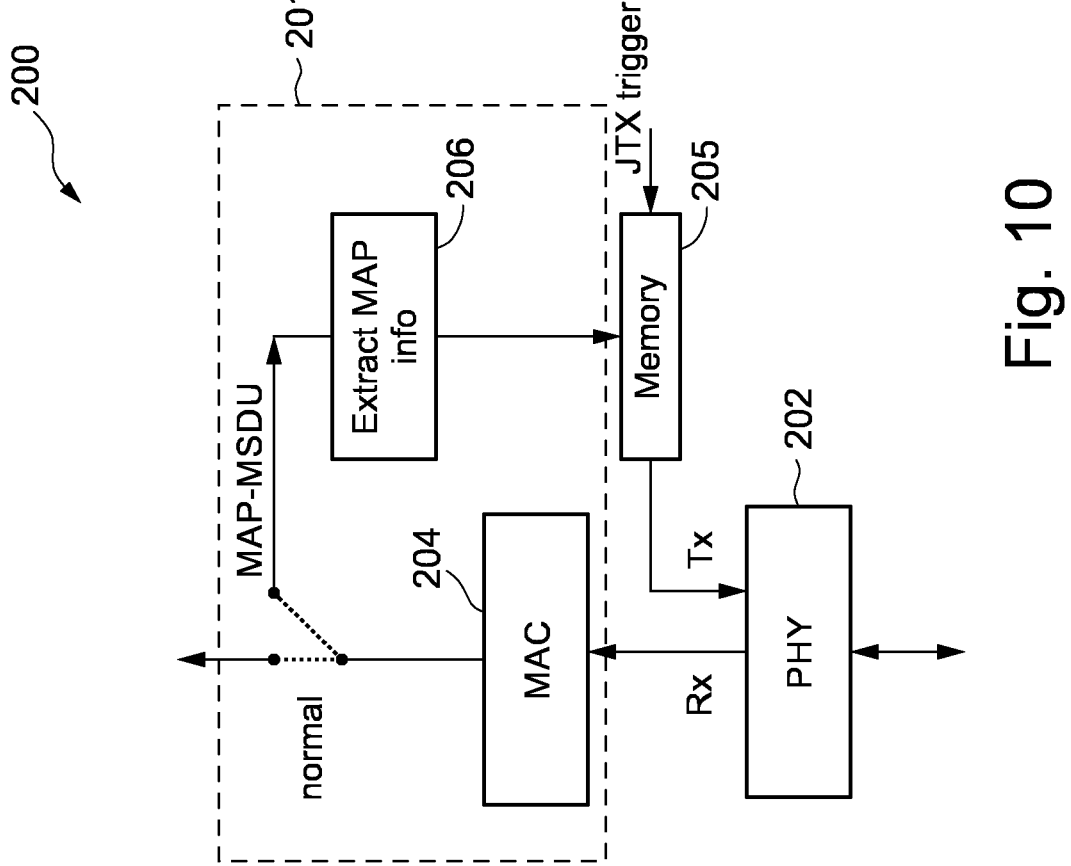
FIG. 10 shows a schematic diagram of a first embodiment of a third communication device to illustrate its operation as slave AP according to WO 2021/084010 A1.
Figure 11:
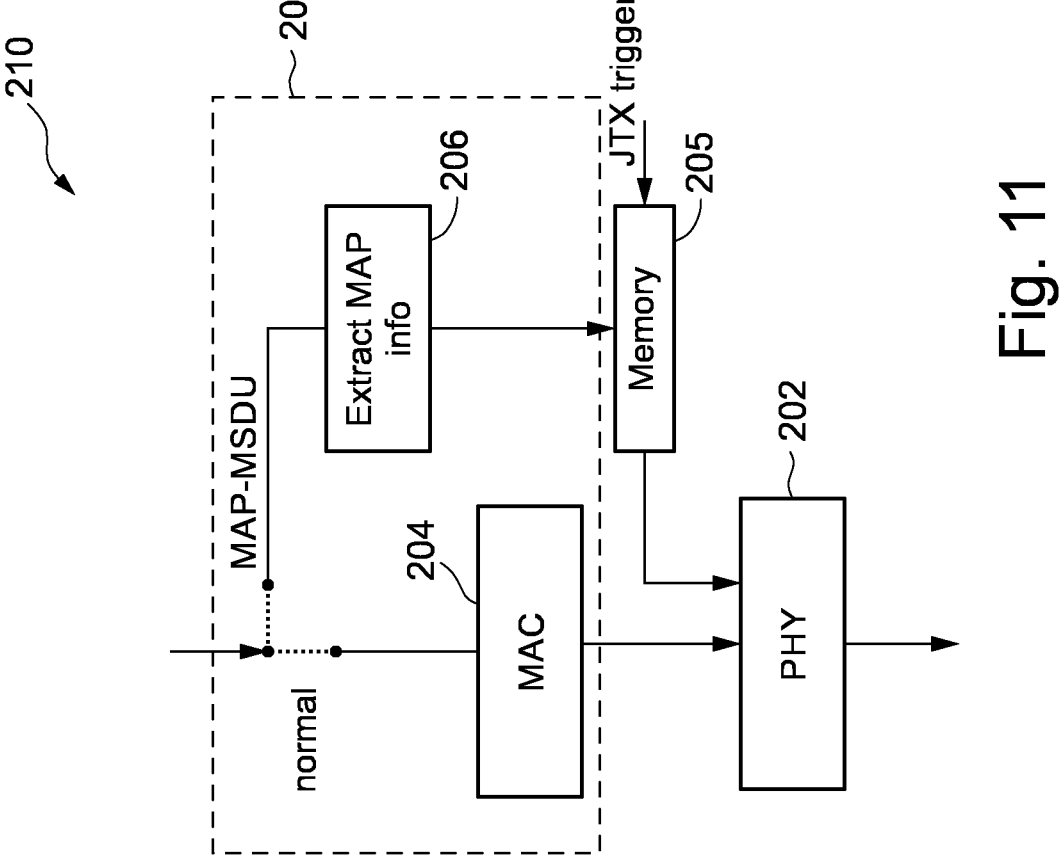
FIG. 11 shows a schematic diagram of a second embodiment of a third communication device to illustrate its operation as slave AP according to WO 2021/084010 A1.
Figure 12:
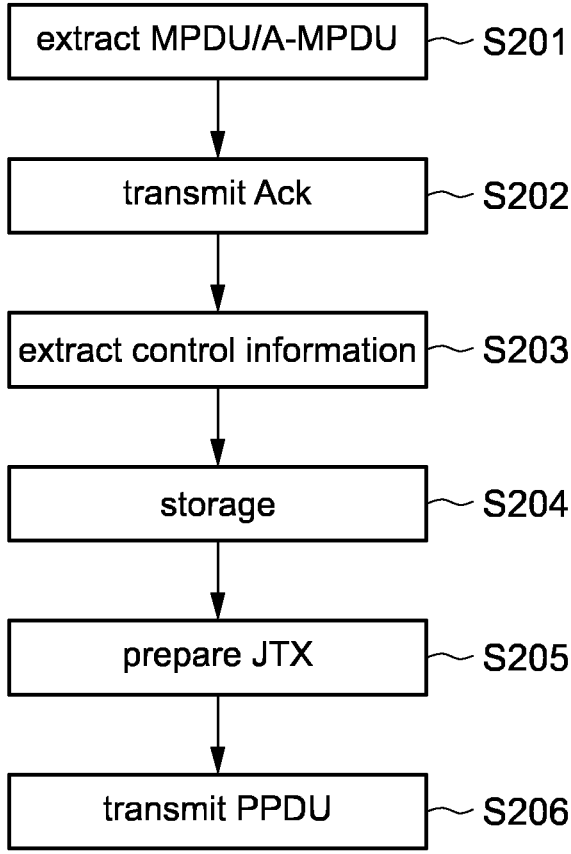
FIG. 12 shows a flowchart of the operation of the MAC unit of the slave AP.

FIGS. 10 and 11 show schematic diagrams of different embodiments of a third communication device 200 and 210 (each having a MAC unit 201 and a PHY unit 202) to illustrate its operation as slave AP in JTX. Once a slave AP receives a MAP-MSDU either via a received PPDU for wireless backhaul (FIG. 10) or via a higher layer interface for wireline backhaul (FIG. 11), it performs the following steps illustrated in the flowchart shown in FIG. 12.

Initially, one or more MAC output data units and the associated control information is obtained by the slave AP from the master AP. In particular, in a first step S201 the MAC unit 201 extracts the MPDU or A-MPDU and the identifier present in the MAP-MSDU (indicated by block 204). In case of wireless backhaul this may contain various steps: The PPDU holding the MAP-MSDU is demodulated, decoded, analyzed, defragmented and decrypted just as a regular PPDU is processed. In step S202 an acknowledgement may be transmitted according to the settings in the PPDU received.

The additional control information residing in the MAP-MSDU is extracted (indicated by block 206) in step S203 and the MPDU or A-MPDU together with the identifier are stored in a memory 205 in step S204. In step S203, the source address may be set to the master AP 100 and the destination address may be set to the station(s) that receives data in JTX.

Subsequently, the slave AP generates PHY output data units by performing PHY layer processing of the MAC output data units for transmission to the STA from the slave AP in coordination with the transmission of PHY output data units generated by the master AP from MAC output data units. In particular, once the slave AP 200/210 receives announcement information (frame), it configures its PHY unit 202 and spatial mapping matrix as indicated in the announcement and forwards the PSDU content, i.e. one or more MPDU or A-MPDU to the PHY unit 202 (step S205). The PHY unit 202 transmits a PPDU with the PSDUs either after a predefined time after the announcement information (frame) or after a trigger received from the master AP (step S206), which is illustrated by the JTX trigger triggering the memory 205 in FIGS. 10 and 11.

Figure 13:
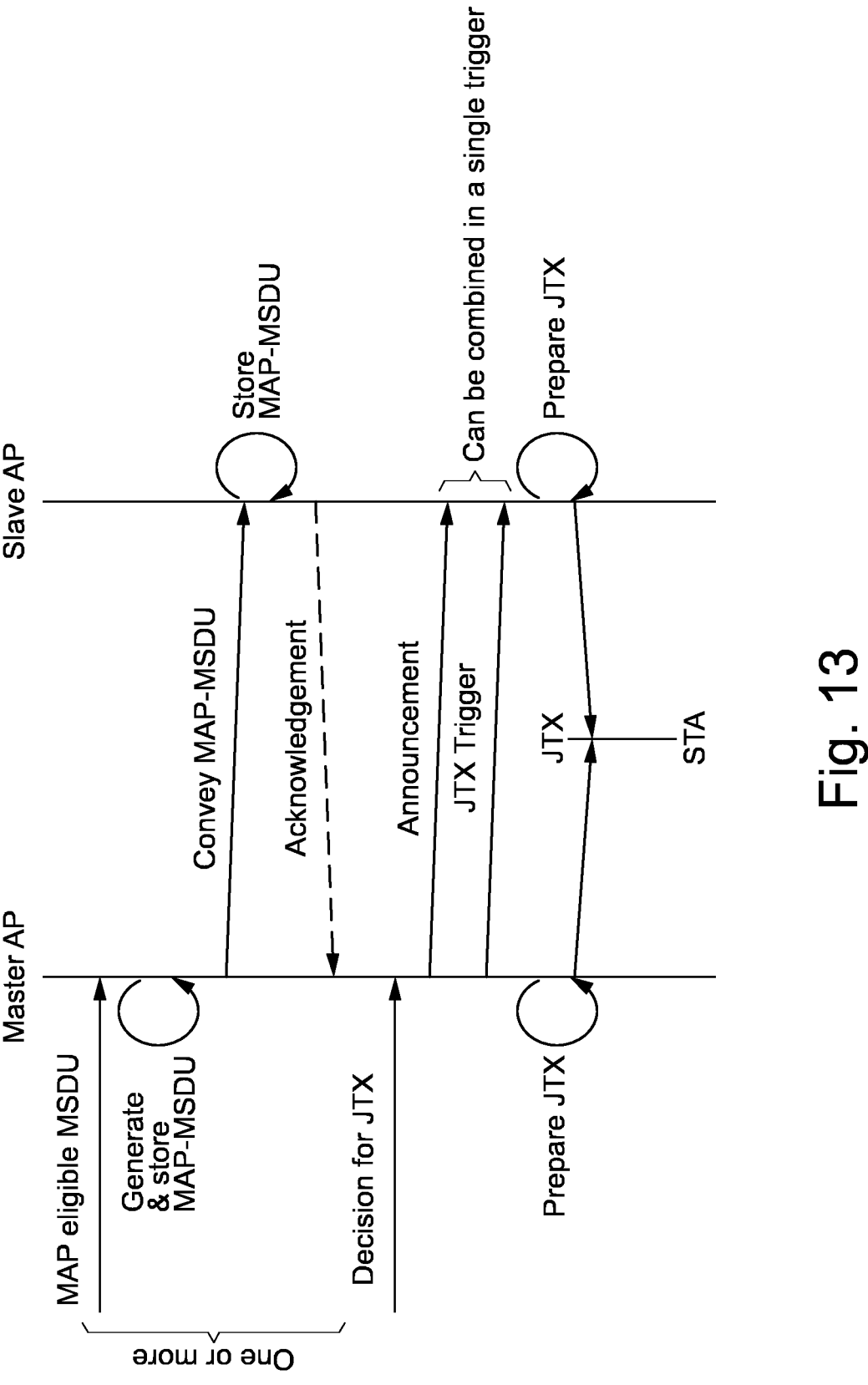
FIG. 13 shows a diagram illustrating the temporal operation of the master AP and the slave AP.

FIG. 13 shows a diagram illustrating the temporal operation of the master AP 200 and the slave AP 200/210 including dependencies between master AP and slave AP.

Figure 14:
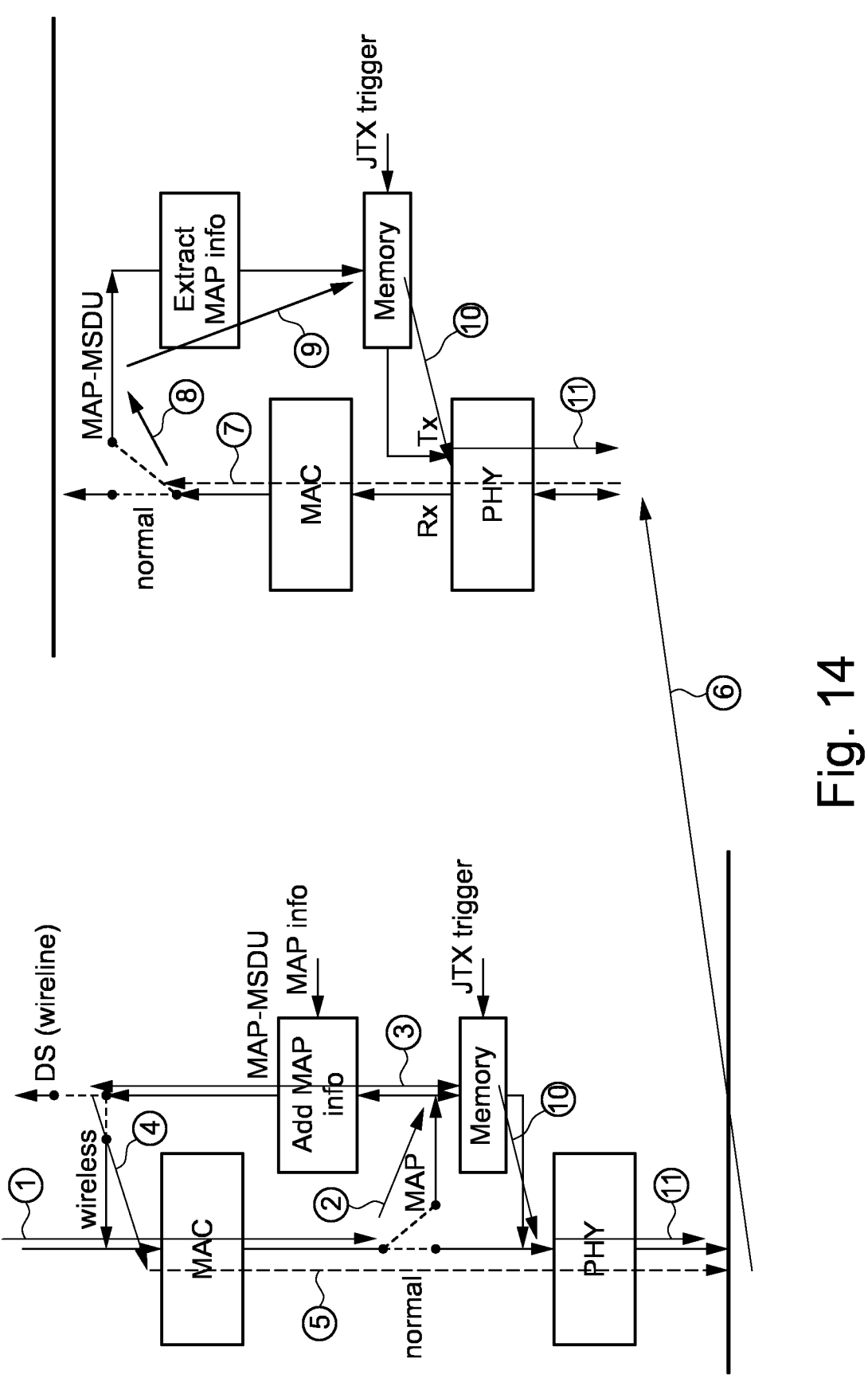
FIG. 14 shows a schematic diagram of the master AP and the slave AP illustrating—for the wireless backhaul case—the sequence of the steps of their operation and the flow of the information according to WO 2021/084010 A1.

FIG. 14 shows a schematic diagram of the master AP 100 (as shown in FIG. 7) and the slave AP 200 (as shown in FIG. 10) illustrating—for the wireless backhaul case—the sequence of the steps of their operation and the flow of the information through the master AP 100 and the slave AP 200, indicated by encircled numbers from 1 to 11.

As shown in FIG. 14, after the backhaul operation, same MAC output data unit resides in memory at master and slave AP (assuming there are only MSDUs that are transmitted from both APs; otherwise, the memory content is a subset of each other). The dashed lines show the transmit and receive PHY MAC operation. Both cancel each other (If there is no transmission error; as this is a regular link, all features such as acknowledgement, retransmissions, etc. can be applied). This is a regular wireless link. The PHY configuration of this link is different to that in JTX. For JTX both APs send at the same time that MAC output data units by PHY layer processing as a PHY output data unit.

Figure 15:
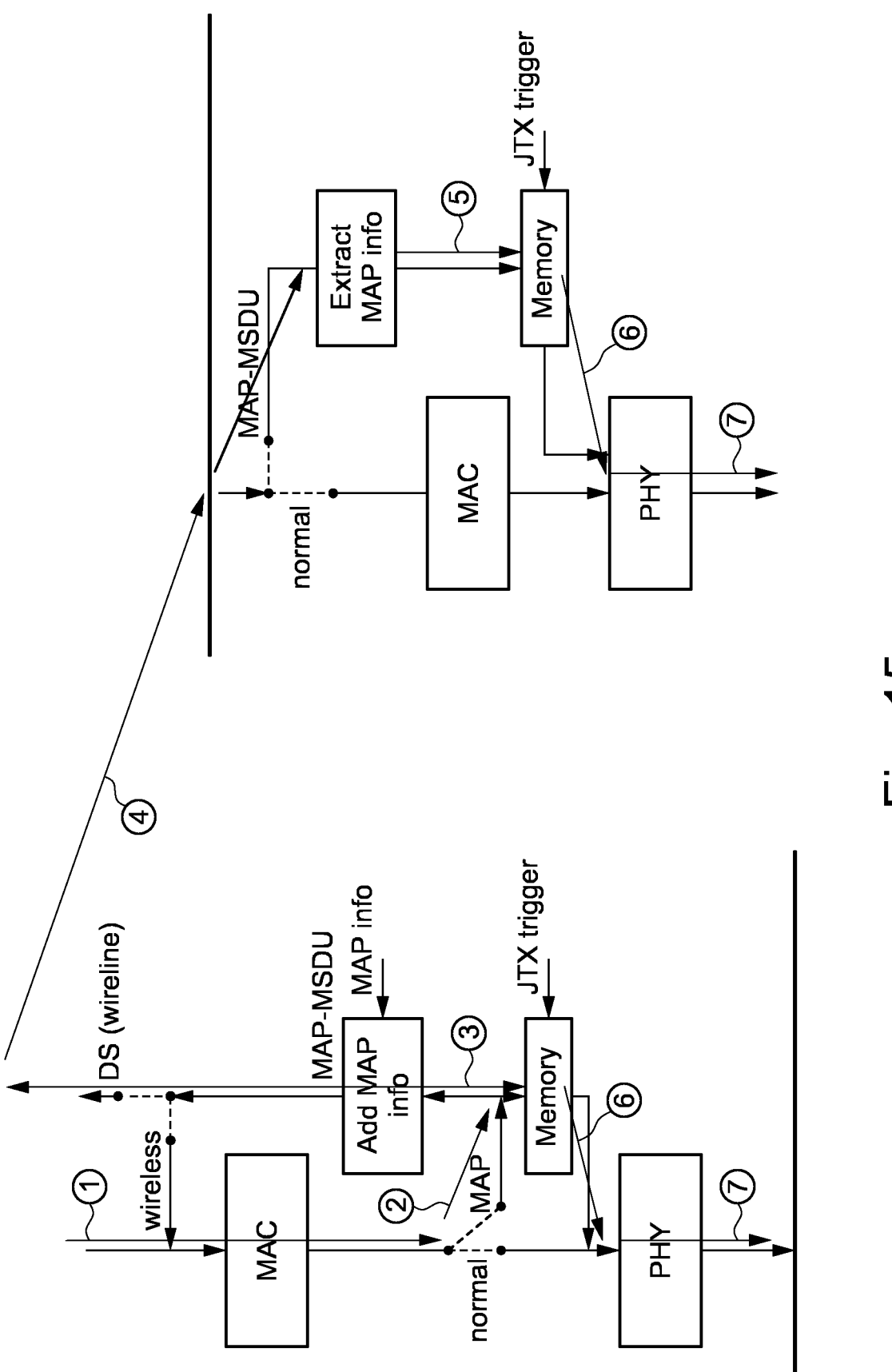
FIG. 15 shows a schematic diagram of the master AP and the slave AP illustrating—for the DS/wireline backhaul case—the sequence of the steps of their operation and the flow of the information according to WO 2021/084010 A1.

FIG. 15 shows a schematic diagram of the master AP 100 (as shown in FIG. 7) and the slave AP 210 (as shown in FIG. 11) illustrating—for the DS/wireline backhaul case—the sequence of the steps of their operation and the flow of the information through the master AP 100 and the slave AP 210, indicated by encircled numbers from 1 to 7.

As shown in FIG. 15, after the backhaul operation, the same MAC output data unit resides in memory at the master AP and the slave AP. For JTX both APs send at the same time these MAC output data units by PHY layer processing as a PHY output data unit.

In some embodiments, a slave AP may actually comprise an AP and a STA. The STA is collocated with the AP and both exchange data internally (e.g. via a station management entity, SME). This is to enable data exchange between AP and STA at all times, because AP to AP communication is not defined for WLAN devices. In this regard, the master AP sends wireless backhaul information to a STA, which is collocated with a slave AP. This STA is configuring the slave AP via internal data exchange as described above.

A MAP-MSDU contains the MPDU or A-MPDU to be transmitted by a slave AP during a JTX. Furthermore, it holds control information. The control information may reside in a frame that is aggregated to the MPDU or A-MPDU or that may be added in the form of a MAP header.

The control information may contain at least an identifier of the MAP-MSDU. This identifier is required for the master AP to indicate to the slave AP prior to JTX which MPDU or A-MPDU within a MAP-MSDU it is supposed to transmit. A slave AP may transmit multiple MPDU or A-MPDU of a MAP-MSDUs in a JTX. Thus, the set of identifiers may arrange the order of MPDU or A-MPDU of MAP-MSDUs to be sent.

In order for a JTX to be successful, more control information may be provided to the slave AP by the master AP. This information may either reside in control information described above or in the announcement frame or in the trigger, which precedes a JTX. The information may include one or more of the configuration of the PHY layer of the slave AP;
(optional) spatial mapping matrix relevant for the slave AP (i.e. at least $Q_2$ in the example above);
spatial stream index or indices that the slave AP is going to serve.

The announcement or trigger frame may include one or more identifiers of the MPDU or A-MPDU within a MAP-MSDUs to be transmitted by the slave APs in the upcoming JTX.

In unlicensed bands interference may be present which may cause a transmitted PPDU to be failed. In WLAN an ARQ (automatic repeat request) mechanism exists, which request erroneously received MPDUs of a PPDU or the entire PPDU to be retransmitted. In the context of unlicensed bands, in which a retransmission may happen as often as about 1% to 10% of all delivered data units, retransmitting each MAP-MSDUs that are related to a failed MPDU, would yield an unacceptable high load to the backhaul.

It is the objective of the present disclosure to enable retransmissions in JTX that are very efficient regarding required backhaul bandwidth. Generally, one element of the disclosure is to reuse the initial backhaul information conveyed within the MAP-MSDU for retransmission. However, the solution is more complex, because a retransmission involves the MAC layer, which, according to prior art, resides at master AP only.

Figures 16, 17:
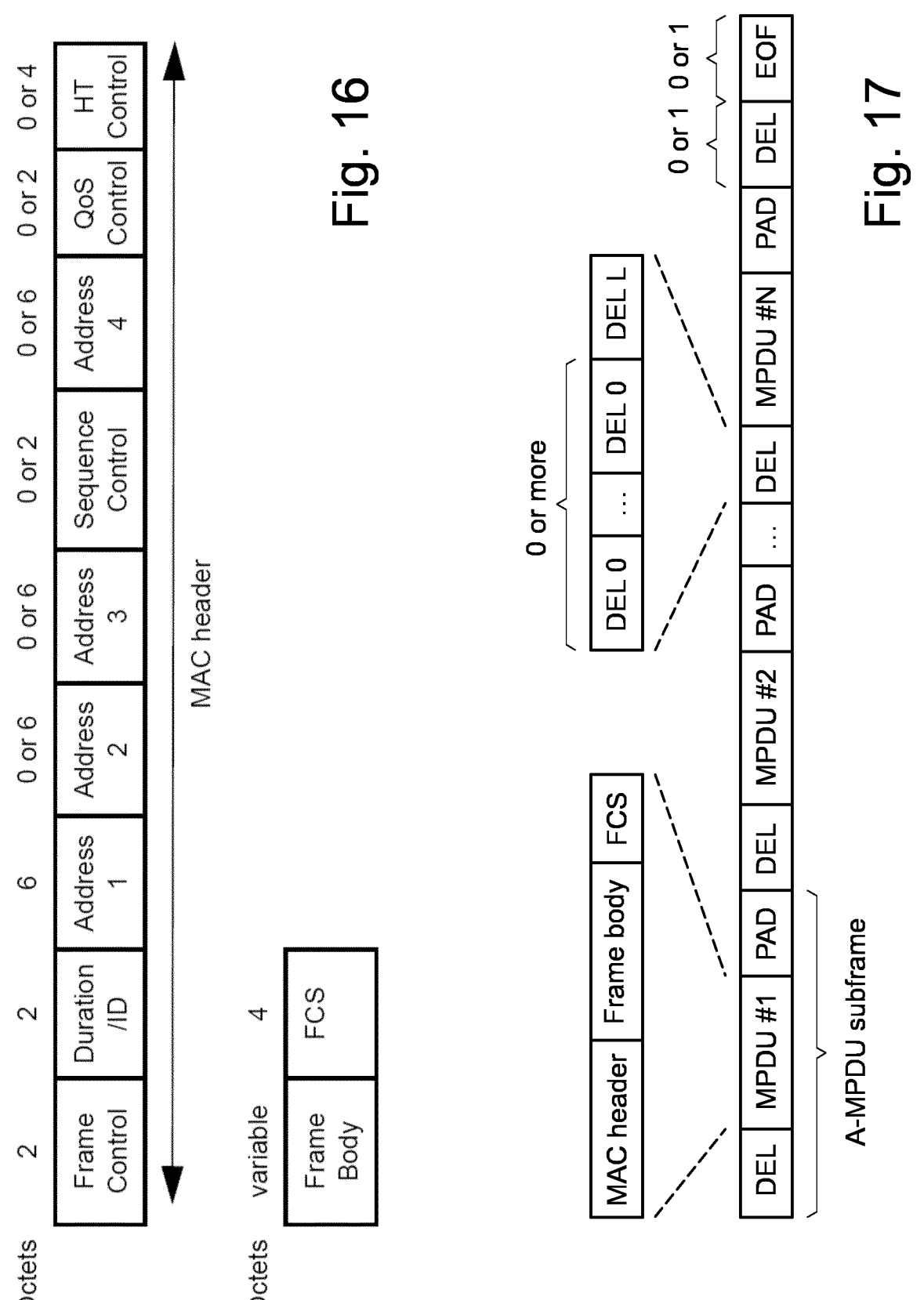
FIG. 16 shows a diagram illustrating the structure of a MPDU.
FIG. 17 shows a diagram illustrating the structure of an A-MPDU.

Before going into detail of the present disclosure, the structure of a MPDU is illustrated in FIG. 16. A MPDU comprises a MAC header that holds control information, a frame body which holds the user data to be conveyed, and a frame check sequence (FCS) which safeguards MAC header and frame body. When a MPDU is retransmitted, the frame control, duration/ID, QoS control and HT control subfield may change compared to an initially transmitted data unit. Since the FCS is computed including the MAC header, the FCS may change too. Some of the subfields shown in FIG. 16 may not be present for some data units.

The frame body may hold encrypted data in which case the frame body contains an encryption preamble, followed by the encrypted data unit and an encryption postamble. The frame body content, regardless if encrypted or not, remains unchanged for a retransmission.

In most simple case, a PSDU can be an MPDU. However, it is possible to aggregate multiple MPDUs within a PSDU in an A-MPDU, whose structure is illustrated in FIG. 17. An A-MPDU comprises multiple A-MPDU subframes which contains a delimiter (DEL), a MPDU, and an optional padding (PAD). A delimiter can be decomposed in zero or more delimiters indicating length zero (DEL 0) and one delimiter indicating the length of the subsequent MPDU (DEL L). After the last A-MPDU subframe another delimiter and/or EOF padding may be present. The DEL 0 is present to keep the minimum MPDU spacing within an A-MPDU that may be required by the receiver MAC layer.

As shown above in FIG. 9, a MAP-MSDU comprises a header that holds control information or information related to the data part and a data part contains all or a fraction of the PSDU that is going to be transmitted in JTX. The present disclosure may require additional information to be included into the MAP header.

Figure 18:
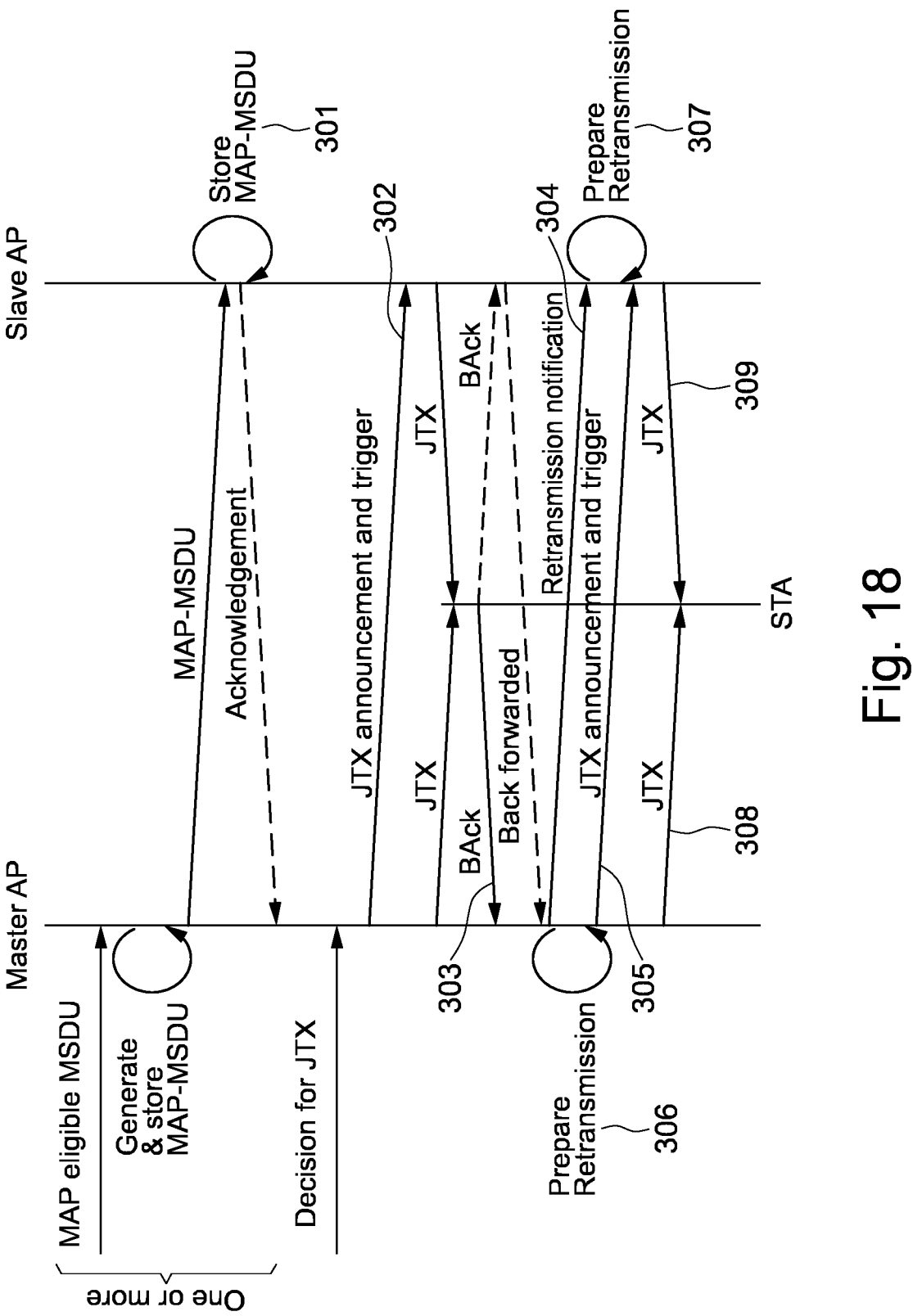
FIG. 18 shows a diagram illustrating the temporal operation of the master AP and the slave AP for retransmission based on PSDU-based backhaul according to an embodiment of the present disclosure.

FIG. 18 shows a diagram illustrating the temporal operation of the master AP 200 and the slave AP 200/210 for retransmission based on PSDU-based backhaul according to the present disclosure. The first part (up to JTX) is similar or even identical to the operation shown in FIG. 13. The second part (following the JTX) are new according to the present disclosure. The step 301 of storing MAP-MSDU at the slave AP is altered such that after a joint transmission, the originating MAP-MSDUs are not discarded but kept, e.g. at least until the status about retransmission is clarified. Additional steps may be done in step 301 which will be elaborated in detail below. The transmission of the announcement and the JTX trigger may be done as separate steps (as shown in FIG. 13) or combined in a single step 302 (as shown in FIG. 18).

After the STA has received a joint transmission, the STA returns in step 303 an acknowledgment or block acknowledgement (BAck) in which it indicates which of the received MPDUs have been correctly (and/or erroneously) received. The BAck is logically transmitted to the master AP, which decides about further steps. This could also imply that the slave AP receives the BAck and forwards the information to the master AP (as indicated by the dashed lines).

Based on the BAck received, the master AP transmits in step 304 a retransmission notification (RN) to the slave AP. The RN includes status of BAck feedback and which one or more selected MPDUs (also referred to as "selected MAC output data units" herein) are subsequently retransmitted. It may further contain one or more of the type of retransmission (MPDU, S-MPDU, or A-MPDU) and/or
modified subfields or related information to these subfields (e.g. modulation coding scheme (MCS), PPDU duration of the retransmission) and/or
frame check sequence (FCS) and/or
EOF information.

The RN can be sent separately as shown in FIG. 18 or together with other frames, e.g. JTX announcement and/or trigger sent in step 305. Conceptual wise, the slave AP may need some time to prepare the retransmission before the actual JTX, for which reason some processing time should be considered by master AP when transmitting RN. The processing delay for preparation of the retransmission should be signaled to the master AP by the slave AP prior to any JTX, e.g. as part of a capability exchange.

Subsequently in steps 306 and 307 the master AP and the slave AP prepare the subsequent retransmission. These steps may each include one or more of the following sub-steps:

Slave and/or Master AP parses MAP-MSDU (this can be done in step 301 already) and extracts the one or more data units to be retransmitted;
Slave and/or Master AP modifies subfields according to RN received;

Slave and/or Master AP recomputes the FCS or copies the FCS from the RN and replaces old FCS; and Slave and/or Master AP aggregates the parsed and modified data units.

The PSDU, i.e. input to PHY layer, is the output of the last step. The PPDU is created after the JTX announcement and trigger (step 305) has been received and the PHY was configured according to information contained therein.

Subsequently in steps 308 and 309, the master AP and the slave AP transmit the previously modified data units according to the PHY settings signaled by master AP in JTX announcement. The master AP may intentionally trigger different PHY settings than in initial JTX to increase reliability. Particularly, the master AP may also create HARQ data units which can be combined with the initially received data unit to increase reliability of successful decoding. The master AP preferably determines the RN and JTX announcement simultaneously as both pieces of information are dependent on each other. For example, the section of the modulation coding scheme (MCS) has a direct impact to the duration/ID subfield.

In the following, several optional sub-steps of step 306/307 are elaborated in more detail.

Figure 19:
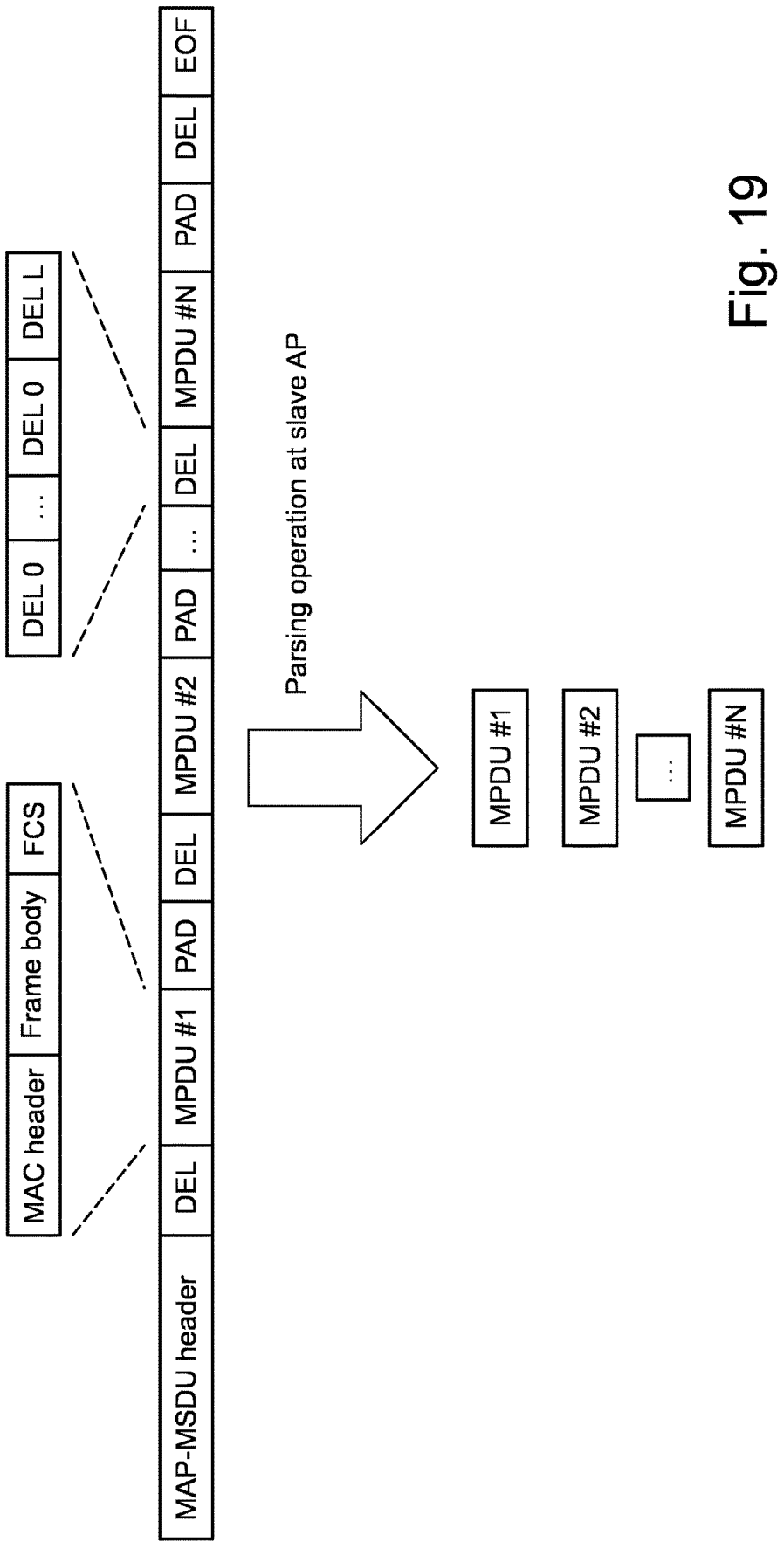
FIG. 19 shows a diagram illustrating parsing a MAP-MSDU if the retransmission is done for a single MPDU.
Figure 20:
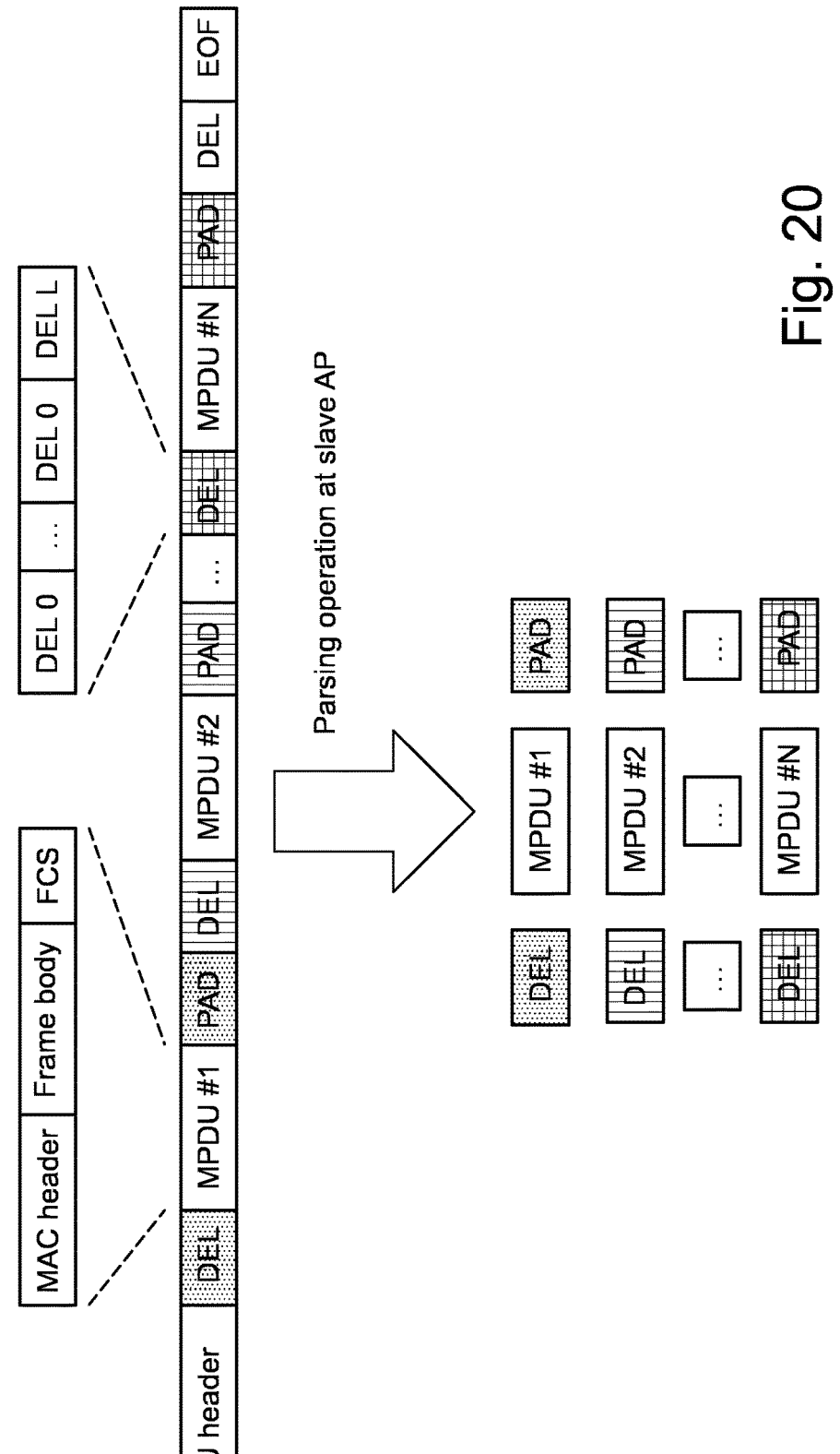
FIG. 20 shows a diagram illustrating parsing a MAP-MSDU if the retransmission is done within an A-MPDU or S-MPDU.

In a first sub-step, the slave AP may perform a parsing operation. The actual parsing operation depends on the type of retransmission. If the retransmission is a single MPDU, the one or more MAP-MSDUs, which were received for the initial transmission, are separated into at least the MPDU that should be retransmitted (FIG. 19). If the retransmission is an A-MPDU or S-MPDU, the one or more MAP-MSDU that were received for the initial transmission, are separated into at least the MPDUs that should be retransmitted, DEL, and PAD (FIG. 20). It may happen that the MAP-MSDU holds no DEL or PAD, because it holds MPDU only. In such a case, the retransmission should be only in MPDU format. This is not an additional burden because, the initial transmission was a single MPDU already.

The DEL part may be extracted because it considers a minimum MPDU spacing requirement. In other embodiments a minimum MPDU start spacing requirement may be signaled. In such cases only the MPDU or DEL or none of them may be parsed from MAP-MSDU.

FIGS. 19 and 20 illustrate the parsing operation for the two different cases of MAC data unit format in retransmission. FIG. 19 shows a diagram illustrating parsing a MAP-MSDU if the retransmission is done for a single MPDU. FIG. 20 shows a diagram illustrating parsing a MAP-MSDU if the retransmission is done within an A-MPDU or S-MPDU.

There are two preferred options to implement the parsing operation. In a first preferred option, the MAP-MSDU header holds information about location and/or size of each component of the MAP-MSDU data part. This enables the slave AP to retrieve the relevant parts out of the bit sequence provided in the data part of the MAP-MSDU. The signaling may be a simple bit or octet count for start and end value of each part, respectively. This option increases the signaling overhead in MAP-MSDU header.

In a second preferred option, in the way the MAP-MSDU data part is designed, it holds a data stream that can be decoded by a receiver MAC layer. Therefore, a receiver MAC layer may be used to parse the data part of the MAP-MSDU into the relevant parts. This option needs less signaling overhead but requires a receiver MAC. However, the receiver MAC may be anyway present at a slave AP.

It shall be noted that this first sub-step can also be done at the point in time of reception of the MAP-MSDU (step 301 in FIG. 18). In this case, the slave AP parses any item of the MAP-MSDU although it may not be needed for later retransmission. In this regard, parsing in step 301 tends to be less efficient.

In a second sub-step, the slave AP may modify MAC header subfields of the parsed MPDUs. The modification is based on the RN and/or the JTX announcement before the retransmission. Thereby, the content of the modified subfields may be either computed based on parameters in JTX announcement or copied from the RN. Modification to the MAC header may be only done in Frame Control, Duration/ID, QoS Control, and/or HT Control subfields. In a simple case, at least the Retry bit within the Frame Control may be changed from 0 (initial TX) to 1 (reTx). Often, the Duration, which indicates the duration of the MPDU or entire A-MPDU, is changed as well. Therefore, if the number of aggregated MPDUs in retransmission changes, for example, because only a subset of MPDUs was erroneous, this value is changed. Also, if the MCS is adapted, e.g. lowered to increase reliability, the net data rate lowers, and consequently the duration changes even if the number of MPDUs stays constant.

After all modifications are done and as the third sub-step, the FCS is recomputed and replaced. Alternatively, the FCS may be also shared by RN and the signaled value may be put into the modified MPDU at appropriate position.

Figure 21:
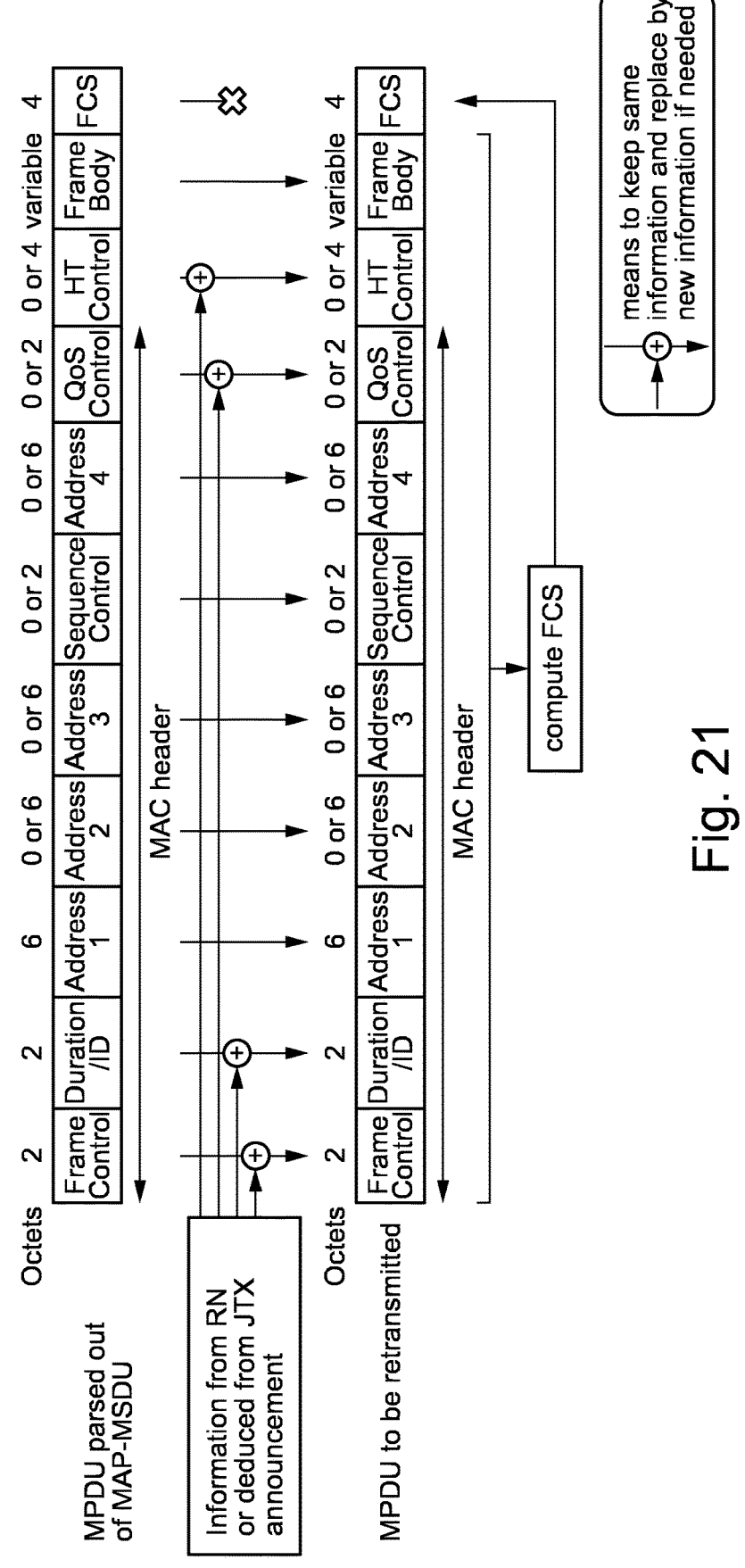
FIG. 21 shows a diagram illustrating the modification of MPDU subfields before retransmission.

FIG. 21 illustrates the second and third sub-steps, in particular the modification of MPDU subfields before retransmission and recomputation of FCS. All subfields other than those mentioned before, may generally be left unchanged, including frame body. Therefore, even if the RN signals all modified subfields, less bandwidth is needed compared to retransmission of the entire MPDU via backhaul. Typically, the frame body is 1500 octets vs. 40 octets of MAC header and FCS. The plus symbol used in FIG. 21 indicates that subfield contents are kept unless there is updated information within the subfield.

In the fourth sub-step, the modified MPDUs are assembled. If the retransmission is of type MPDU, this sub-step is not needed, because the modified MPDU of the second and third sub-steps can be readily transmitted in steps 308/309.

Figures 22, 23:
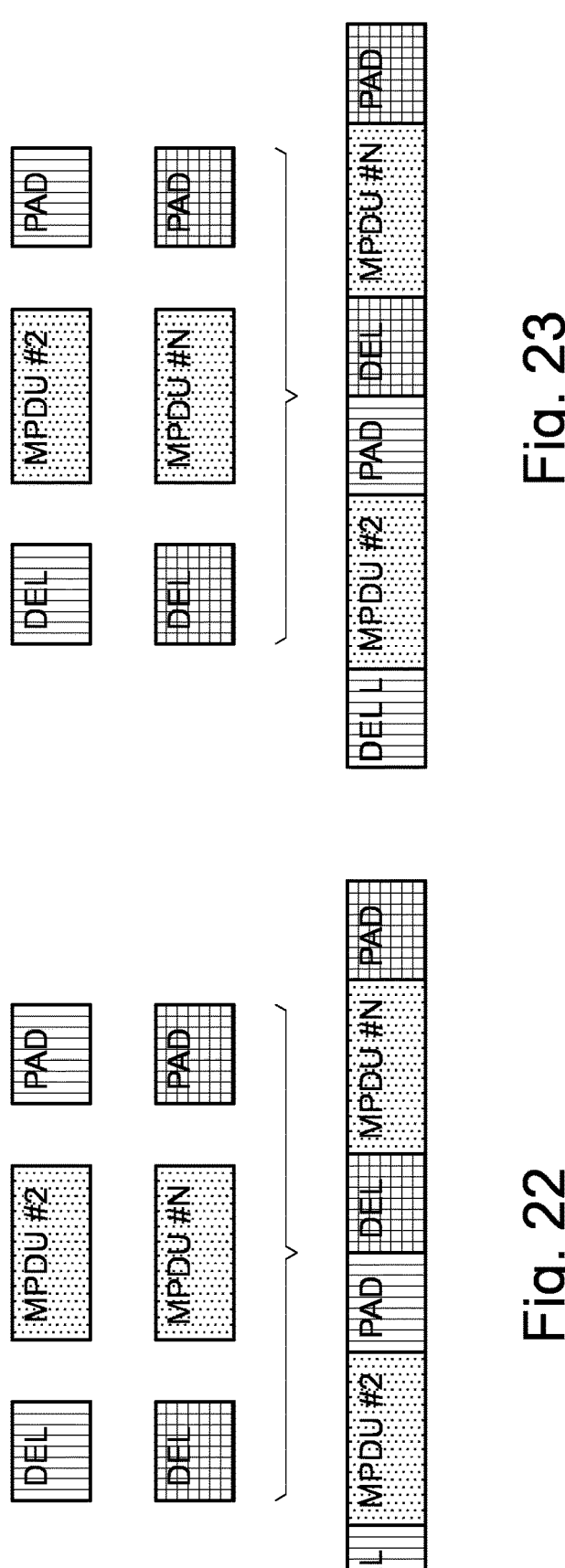
FIG. 22 shows a diagram illustrating the assembly of DEL, PAD, and modified MPDU.
FIG. 23 shows a diagram illustrating the assembly of DEL, PAD, and modified MPDU with removal of DEL 0 from first DEL.

In the A-MPDU case, the DEL before and the PAD after each modified MPDU are concatenated as illustrated in FIG. 22 showing the assembly of DEL, PAD, and modified MPDU. The assumption made in FIG. 22 (and also FIG. 23) is that MPDU #2 and MPDU #N (these are the "selected MAC output data units") of the initial transmission, as shown in FIG. 20, need to be retransmitted. In cases, when the first MPDU of the retransmission has not been the first MPDU in the initial transmission (that is the case for MPDU #2), the first DEL in the assembled A-MPDU may hold DEL 0 elements that are not required and cause undesired overhead. In such case, the DEL 0 elements should be deleted from the first DEL as illustrated in FIG. 23 showing the assembly of DEL, PAD, and modified MPDU with removal of DEL 0 from first DEL. It shall be noted that the removal of DEL 0 reduces the overall A-MPDU or S-MPDU length and should therefore be considered in computation of the duration in the second sub-step. Removal of DEL 0 is as simple as discarding all bits of DEL except the last 4 octets, which belong to DEL L.

Figure 24:
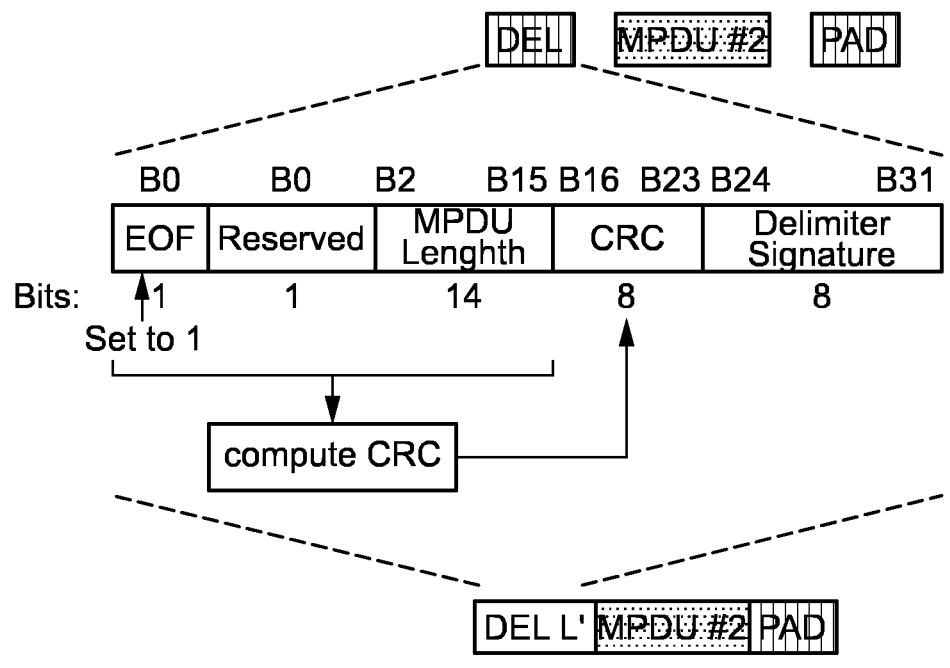
FIG. 24 shows a diagram illustrating the assembly of DEL', PAD and modified MPDU within an S-MPDU.

In the S-MPDU case, the single MPDU is basically assembled as illustrated in FIG. 23, i.e. DEL 0 parts are removed from the first and only DEL. Furthermore, DEL L may need a modification for the receiver to detect the S-MPDU reliably. Therefore, as illustrated in FIG. 24 showing the assembly of DEL L', PAD and modified MPDU within an S-MPDU, the EOF of DEL L is set to 1 and the CRC of the delimiter is recomputed (creating DEL L'). Alternatively, this new delimiter may be contained in RN. After this step, all components, the modified DEL L (=DEL L'), the modified MPDU and the PAD may be concatenated in this order.

At the end of the fourth sub-step, the following items may be appended additionally. The selection of these items is determined by RN:

a) Nothing: This item terminates the fourth sub-step, and the next step is the joint retransmission in steps 308/ 309.

b) Padding to align end times of various users (multi-user PPDU only, i.e. OFDMA and/or MU MIMO): After this item is selected, the next step is item a).

c) Addition of further MPDUs including DEL and PAD, i.e. A-MPDU subframes (only if retransmission is within an A-MPDU): Item c) may be chosen multiple times, followed by either item a) or b).

Figure 25:
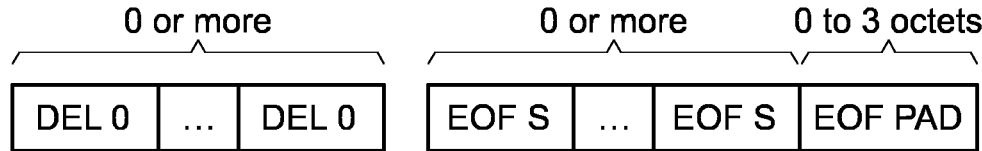
FIG. 25 shows a diagram illustrating additional DEL 0 or EOF padding to pad a PSDU.

For item b), DEL 0 padding and/or EOF padding is present depending on PPDU format. The appropriate padding length is indicated by RN. Related subfields may be created by slave AP in a standardized way or may be signaled by the RN. If needed, the slave AP may repeat the signaled basic elements, i.e. one DEL 0 and/or one EOF subfield, multiple times. FIG. 25 illustrates the appended sequences. Each DEL 0 or EOF subfield (EOF S) has a length of 4 octets.

Figure 26:
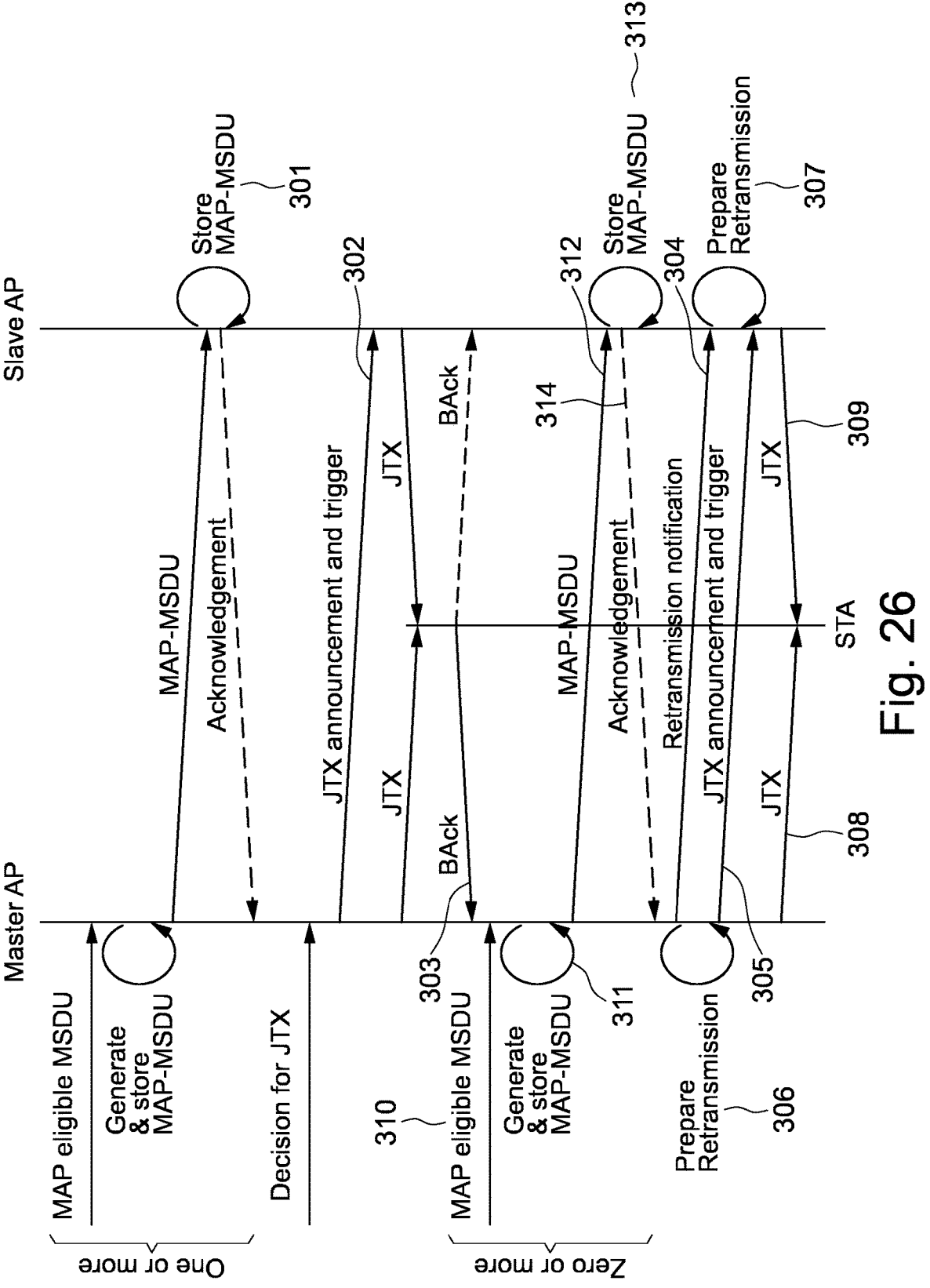
FIG. 26 show a diagram illustrating the temporal operation of the master AP and the slave AP for retransmission with PSDU-based backhaul in which the retransmission includes new data units according to another embodiment of the present disclosure.

FIG. 26 showing a flowchart of another embodiment of the proposed retransmission scheme for JTX with PSDU-based backhaul in which the retransmission includes new data units. For item c), additional one or more A-MPDU subframes received in step 310 that are contained in further MAP-MSDUs (generated and stored in step 311) may be added. Those A-MPDU subframes may hold MPDUs that are transmitted for the first time. Those MAP-MSDU are identified by the RN transmitted in step 304. It is the objective of the master AP to ensure that the content of the one or more MAP-MSDUs that are to be appended by the slave AP, fit regarding their delimiters, MPDU header information, PAD subfield, and RN content. This is required to minimize the required slave AP logic to essentially concatenating new A-MPDU subfields. Therefore, the master AP preferably transmits (in step 312) those MAP-MSDUs after it is aware of the content of the RN, i.e. after the received BAck (step 303), but before the RN is transmitted (step 304), as illustrated in FIG. 26. The additional MAP-MSDUs are stored by the slave AP in step 313, and the slave AP may acknowledge receipt in step 314.

While according to the operation described in WO 2021/ 084010 A1, the slave AP could empty its MAP-MSDUs memory after the JTX, according to the present disclosure it shall store these data units at least until the RN indicates that all or a portion of the MAP-MSDUs are not needed for retransmission. Since the slave AP has a maximum memory size for MAP-MSDUs, it may signal the size to the master AP prior to any JTX. The master AP may ensure that the oldest one or more MAP-MSDU are not needed anymore before transmitting one or more new MAP-MSDU. Furthermore, the master AP may not request a retransmission by transmitting an RN to the slave AP that requires at least one MAP-MSDUs or a fraction of it that is not stored in the memory of the slave AP anymore.

The master AP may also indicate in the RN, e.g. by sequence number, which of the data units stored within the slave AP should be deleted. This may be applicable if a maximum number of retransmission or data unit lifetime is reached.

The storage of MAP-MSDUs in the slave AP's memory may be done in different ways. The implemented option may be signaled by the slave AP to the master AP. According to one option the storage of MAP-MSDUs may be done MAP-MSDU wise. A new MAP-MSDU overwrites the oldest MAP-MSDU. This option offers simple processing, but it may be inefficient in terms of memory usage and/or fragmentation if MAP-MSDUs have different size and/or if only a fraction needs to be retransmitted. For this option, the slave AP may always replace the oldest entries of MAP-MSDUs in its memory by the newly received MAP-MSDU.

According to another option the storage of MAP-MSDUs may be done fraction of MAP-MSDU wise. A MAP-MSDU is separated into its A-MPDU subframes first and A-MPDUs subframes are stored in memory. This option requires pre-processing but it may be more efficient in terms of memory usage and/or fragmentation. Only those A-MPDU subframes that correspond to correctly received MPDUs are deleted; hence, the slave AP may extract information contained in the RN to free its memory.

One or more pieces of the following information may be included in a MAP-MSDU header according to the present disclosure:

An identifier, e.g. a number.

Location (=beginning and end, or beginning and length) of each MPDU or A-MPDU subframe and its components. This information is only needed when the slave AP does not apply its MAC layer for MAP-MSDU parsing as described above.

Presence and location of Sequence Control and/or QoS Control and/or HT Control within each MPDU header. Frame control, duration/ID, and FCS may always be present and can be deduced from beginning and/or end of each MPDU.

Sequence number of each MPDU contained in the MAP-MSDU. The sequence number is contained often within MPDU header too. However, this signaling eases parsing of the MAP-MSDU as will become apparent from the RN contents below.

One or more pieces of the following information may be included in a retransmission notification (RN) according to the present disclosure:

Identifier of the one or more selected MPDU(s) to be retransmitted. The identification may be done by sequence number. Conversely, also the MPDU(s) that do not need to be retransmitted can be identified.

The type of retransmission (MPDU, S-MPDU, or A-MPDU).

Modified subfields and/or information related to these subfields (e.g. duration, MCS). The modified subfields may include MAC header and/or FCS or a part of it and related information. If the modified subfields are different among MPDUs to be retransmitted such as FCS for example, the modified subfields are present for each MPDU or A-MPDU subframe to be retransmitted.

PAD and/or EOF padding information if needed.

DEL L' for S-MPDU if not computed by slave AP.

Identifier of additional MPDU(s) or A-MPDU subframes to be transmitted on top of retransmission. Those MPDU(s) or A-MPDU subframes are identified by their sequence number.

The order of the MPDUs or A-MPDU subframes within an A-MPDU, if the order is not implicitly given, e.g. by order of the signaling or first-in, first-out (FIFO) approach.

Figure 27:
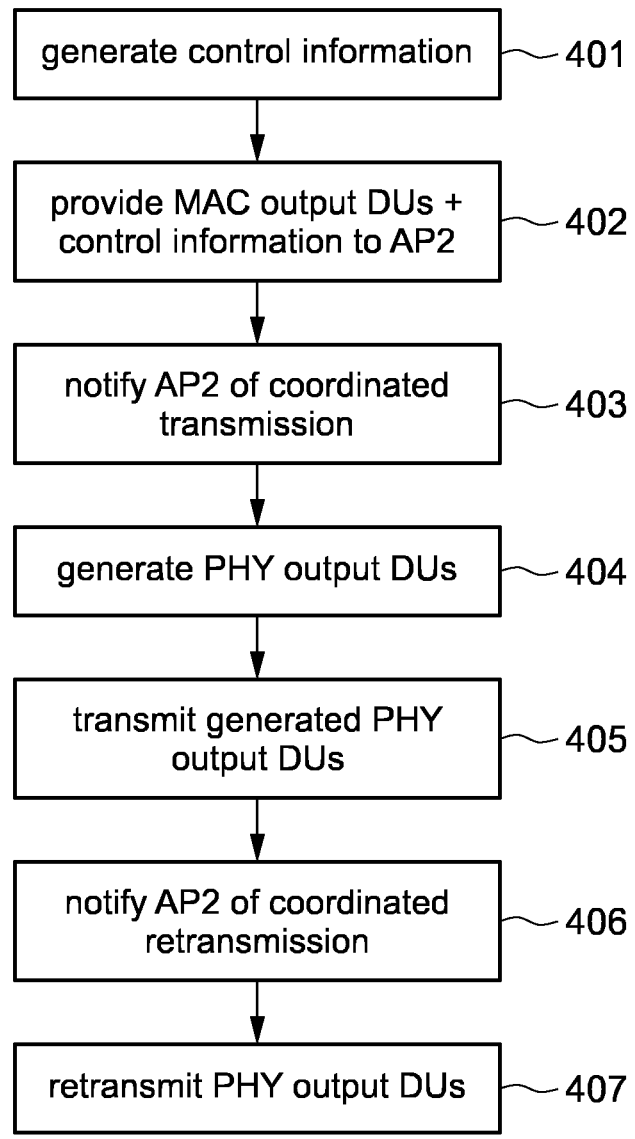
FIG. 27 shows a flowchart illustrating the general layout of a communication method of the first communication device.

FIG. 27 shows a flowchart illustrating the general layout of a communication method of the master AP (first communication device). In a first step 401 control information is generated for one or more MAC output data units, the control information indicating that the one or more MAC output data units are to be physical (PHY) layer processed by the third communication device and to be transmitted to a second communication device from the third communication device and from the first communication device. In a second step 402 the one or more MAC output data units and the associated control information are provided to the third communication device for generation of one or more PHY output data units and storage of the one or more MAC output data units for transmission and possibly required retransmission. In a third step 403 the third communication device is notified of a coordinated transmission of the one or more MAC output data units by the first communication device and the third communication device. In a fourth step 404 one or more PHY output data units are generated by performing PHY layer processing of the one or more MAC output data units for transmission to the second communication device from the first communication device in the coordinated transmission with the transmission of one or more PHY output data units generated by the third communication device from the one or more MAC output data units. In a fifth step 405 the one or more PHY output data units generated from the one or more MAC output data units are transmitted in the coordinated transmission. In a sixth step 406 the third communication device is notified of a coordinated retransmission of one or more selected MAC output data units by the first communication device and the third communication device in case of a required retransmission. In a seventh step 407 one or more PHY output data units generated from the one or more selected MAC output data units are transmitted in the coordinated retransmission.

Figure 28:
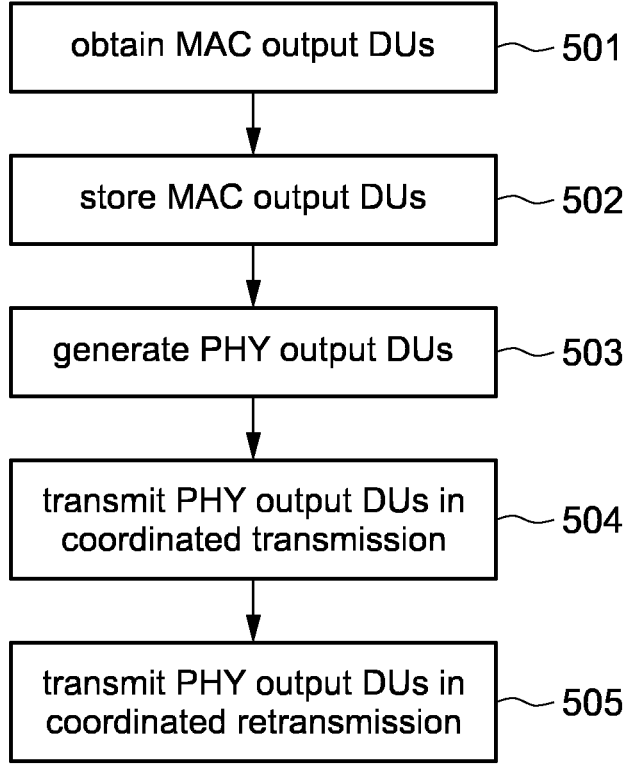
FIG. 28 shows a flowchart illustrating the general layout of a communication method of the third communication device.

FIG. 28 shows a flowchart illustrating the general layout of a communication method of the slave AP (third communication device). In a first step 501 one or more media access control (MAC) output data units and associated control information from a first communication device, the control information indicating that the one or more MAC output data units are to be physical (PHY) layer processed by the third communication device and to be transmitted to the second communication device from the third communication device and from the first communication device. In a second step 502 the one or more MAC output data units are stored for transmission and possibly required retransmission until a coordinated retransmission is finished or a predetermined condition is fulfilled. In a third step 503 PHY output data units are generated by performing PHY layer processing of the one or more MAC output data units for transmission to the second communication device from the third communication device in a coordinated transmission with the transmission of one or more PHY output data units generated by the first communication device from the one or more MAC output data units. In a fourth step 504 the one or more PHY output data units are transmitted in the coordinated transmission in response to a notification from the first communication device notifying the third communication device of the coordinated transmission of the one or more MAC output data units by the first communication device and the third communication device. In a fifth step 505 one or more PHY output data units generated from one or more selected MAC output data units are transmitted in a coordinated retransmission in response to a notification from the first communication device notifying the third communication device of a coordinated retransmission of the one or more selected MAC output data units by the first communication device and the third communication device in case of a required retransmission.

Thus, to summarize this disclosure, a mechanism that allows to reuse the data units that were conveyed via the backhaul from a master AP to a slave AP for an initial transmission for any subsequent retransmission. Thereby, the bandwidth requirement of the backhaul link is significantly lowered when retransmissions take place. In particular, the difficulty that the contents of the data units change within a retransmission is addressed. Further, an ARQ mechanism may be used to react on erroneously received data units in joint transmission in which there is no requirement for the slave AP to contain a MAC layer. Still further, a mechanism to include retransmissions and initially transmitted data units to a retransmission in joint transmission scenario is provided.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors which are programmed or configured according to software code. A circuit does not include pure software, although a circuit includes the above-described hardware executing software. A circuit or circuitry may be implemented by a single device or unit or multiple devices or units, or chipset(s), or processor(s).

It follows a list of further embodiments of the disclosed subject matter:

1. First communication device comprising circuitry configured to:

generate control information for one or more MAC output data units, the control information indicating that the one or more MAC output data units are to be physical (PHY) layer processed by the third communication device and to be transmitted to a second communication device from the third communication device and from the first communication device;

provide the one or more MAC output data units and the associated control information to the third communication device for generation of one or more PHY output data units and storage of the one or more MAC output data units for transmission and possibly required retransmission;

notify the third communication device of a coordinated transmission of the one or more MAC output data units by the first communication device and the third communication device;

generate one or more PHY output data units by performing PHY layer processing of the one or more MAC output data units for transmission to the second communication device from the first communication device in the coordinated transmission with the transmission of one or more PHY output data units generated by the third communication device from the one or more MAC output data units;

transmit one or more PHY output data units generated from the one or more MAC output data units in the coordinated transmission;

notify the third communication device of a coordinated retransmission of one or more selected MAC output data units by the first communication device and the third communication device in case of a required retransmission; and transmit one or more PHY output data units generated from the one or more selected MAC output data units in the coordinated retransmission.

2. First communication device as defined in embodiment 1, wherein the circuitry is configured to use a same link between the first communication device and the third communication device for notifying the third communication device of the coordinated transmission and of the coordinated retransmission.

3. First communication device as defined in embodiment 1 or 2, wherein the circuitry is configured to decide, based on feedback information received from the second communication device and/or the third communication device, if one or more MAC output data units shall be retransmitted and which one or more MAC output data units shall be retransmitted in the coordinated retransmission.

4. First communication device as defined in any one of the preceding embodiments, wherein the circuitry is configured to notify the third communication device of a coordinated transmission by transmitting a transmission trigger and/or announcement compressing one or more of an identifier of the one or more MAC output data units to be used for generating the PHY output data units for transmission to the second communication device by the third communication device in the coordinated transmission, PHY layer configuration information indicating the configuration of PHY layer circuitry of the third communication device used for generating the one or more PHY output data units, spatial mapping information indicating spatial mapping performed by the third communication device used in the coordinated transmission, and stream index information indicating one or more streams served by the third communication device used in the coordinated transmission.

5. First communication device as defined in any one of the preceding embodiments, wherein the circuitry is configured to notify the third communication device of the information that the third communication device has to modify within the one or more MAC output data units and/or subframes in an aggregate MAC output data unit in the coordinated retransmission compared to the previous transmission.

6. First communication device as defined in embodiment 5, wherein the circuitry is configured to notify the third communication device of a coordinated retransmission by transmitting a retransmission notification indicating that a coordinated retransmission is desired and a retransmission trigger and/or announcement initiating the coordinated retransmission, wherein the retransmission notification and the retransmission trigger and/or announcement are transmitted as separate notifications or as common notification.

7. First communication device as defined in embodiment 6, wherein the retransmission notification comprises one or more of the status of feedback information received from the second communication device and/or the third communication device, an identifier of the one or more selected MAC output data units to be used for generating one or more selected PHY output data units for retransmission to the second communication device by the third communication device in the coordinated retransmission, the type of retransmission, modified subfields or information related to these subfields, one or more frame check sequences, padding, delimiters and/or end-of-frame (EOF) information, an identifier of additional MAC output data units to be transmitted in addition to the one or more selected MAC output data units to be retransmitted, and order information indicating the order of subframes of the one or more selected and/or additional MAC output data units within an aggregate MAC output data unit.

8. First communication device as defined in embodiment 6 or 7, wherein the retransmission trigger and/or announcement comprises one or more of an identifier of the one or more selected MAC output data units to be used for generating one or more selected PHY output data units for retransmission to the second communication device by the third communication device in the coordinated transmission, PHY layer configuration information indicating the configuration of PHY layer circuitry of the third communication device used for generating the one or more selected PHY output data units, spatial mapping information indicating spatial mapping performed by the third communication device used in the coordinated retransmission, and stream index information indicating one or more streams served by the third communication device used in the coordinated retransmission.

9 First communication device as defined in any one of the preceding embodiments, wherein the communication circuitry is configured to signal to the third communication device if and which of the stored MAC output data units can be deleted and/or if retransmitted MAC output data units have been successfully received by the second communication device.

10. First communication device as defined in any one of the preceding embodiments, wherein the control information and/or a MAC output data unit comprises one or more of an identifier of the MAC output data unit, location information indicating i) beginning and end or indicating ii) beginning and length of the MAC output data unit or a subframe within an aggregate MAC output data unit comprising two or more MAC output data units, presence and location of Sequence Control and/or Quality of Service (QOS) Control and/or High Throughput (HT) Control, and a sequence number.

11. First communication device as defined in any one of the preceding embodiments, wherein the circuitry is configured to insert more than one MAC output data unit into an aggregate MAC output data unit having a plurality of subframes and to separate the MAC output data units within the aggregate MAC output data unit by delimiters.

12. First communication device as defined in any one of the preceding embodiments, wherein the circuitry is configured to generate MAC output data units by performing MAC layer processing of MAC input data units to be transmitted to the second communication device.

13. Third communication device comprising circuitry configured to:

obtain one or more media access control (MAC) output data units and associated control information from a first communication device, the control information indicating that the one or more MAC output data units are to be physical (PHY) layer processed by the third communication device and to be transmitted to the second communication device from the third communication device and from the first communication device;

store the one or more MAC output data units for transmission and possibly required retransmission until a coordinated retransmission is finished or a predetermined condition is fulfilled;

generate PHY output data units by performing PHY layer processing of the one or more MAC output data units for transmission to the second communication device from the third communication device in a coordinated transmission with the transmission of one or more PHY output data units generated by the first communication device from the one or more MAC output data units;

transmit the one or more PHY output data units in the coordinated transmission in response to a notification from the first communication device notifying the third communication device of the coordinated transmission of the one or more MAC output data units by the first communication device and the third communication device; and transmit one or more PHY output data units generated from one or more selected MAC output data units in a coordinated retransmission in response to a notification from the first communication device notifying the third communication device of a coordinated retransmission of the one or more selected MAC output data units by the first communication device and the third communication device in case of a required retransmission.

14. Third communication device as defined in embodiment 13, wherein the circuitry is configured to parse one or more MAC output data units to be retransmitted from the stored MAC output data units based on location information included in the MAC output data units or by use of MAC layer processing of the MAC output data units.

15. Third communication device as defined in embodiment 14, wherein the circuitry is configured, in the parsing operation, to separate within the one or more MAC output data units the MAC output data unit, delimiters and padding fields.

16. Third communication device as defined in any one of embodiments 13 to 15, wherein the circuitry is configured to modify one or more subfields of the one or more MAC output data units to be retransmitted based on information included in the notification received from the first communication device.

17. Third communication device as defined in embodiment 16, wherein the circuitry is configured to recompute a frame check sequence (FCS) of the one or more MAC output data units and/or to copy the FCS from the notification from the first communication device and replace the existing FCS in the one or more MAC output data units by the recomputed or copied FCS.

18. Third communication device as defined in embodiment 14 and 15, wherein the circuitry is configured to aggregate the parsed and modified MAC output data units, wherein delimiters and/or padding fields taken from parsed MAC output data units are added between subsequent MAC output data units.

19. Third communication device as defined in embodiment 18, wherein the circuitry is configured to modify the last padding field according to a received notification and/or to modify the first delimiter to contain only non-duplicated information.

20. Third communication device as defined in any one of embodiments 13 to 19, wherein the circuitry is configured to delete MAC output data units and/or subframes if one or more of the following conditions is fulfilled:

they have been retransmitted, a notification is received from the first communication device that they can be deleted, a notification is received from the second communication device that they have been successfully received, and a predetermined time duration has passed.

21. Third communication device as defined in any one of embodiments 13 to 20, wherein the circuitry is configured to store newly obtained MAC output data units by overwriting the oldest stored MAC output data units and/or including multiple MAC output data units into an aggregate MAC output data unit by subframes and storing only the subframes.

22. First communication method of a first communication device, the method compressing:

generating control information for one or more MAC output data units, the control information indicating that the one or more MAC output data units are to be physical (PHY) layer processed by the third communication device and to be transmitted to a second communication device from the third communication device and from the first communication device;

providing the one or more MAC output data units and the associated control information to the third communication device for generation of one or more PHY output data units and storage of the one or more MAC output data units for transmission and possibly required retransmission;

notifying the third communication device of a coordinated transmission of the one or more MAC output data units by the first communication device and the third communication device;

generating one or more PHY output data units by performing PHY layer processing of the one or more MAC output data units for transmission to the second communication device from the first communication device in the coordinated transmission with the transmission of one or more PHY output data units generated by the third communication device from the one or more MAC output data units;

transmitting the one or more PHY output data units generated from the one or more MAC output data units in the coordinated transmission;

notifying the third communication device of a coordinated retransmission of one or more selected MAC output data units by the first communication device and the third communication device in case of a required retransmission; and transmitting one or more PHY output data units generated from the one or more selected MAC output data units in the coordinated retransmission.

23. Third communication method of a third communication device, the method comprising:

obtaining one or more media access control (MAC) output data units and associated control information from a first communication device, the control information indicating that the one or more MAC output data units are to be physical (PHY) layer processed by the third communication device and to be transmitted to the second communication device from the third communication device and from the first communication device; storing the one or more MAC output data units for transmission and possibly required retransmission until a coordinated retransmission is finished or a predetermined condition is fulfilled;

generating PHY output data units by performing PHY layer processing of the one or more MAC output data units for transmission to the second communication device from the third communication device in a coordinated transmission with the transmission of one or more PHY output data units generated by the first communication device from the one or more MAC output data units;

transmitting the one or more PHY output data units in the coordinated transmission in response to a notification from the first communication device notifying the third communication device of the coordinated transmission of the one or more MAC output data units by the first communication device and the third communication device; and transmitting one or more PHY output data units generated from one or more selected MAC output data units in a coordinated retransmission in response to a notification from the first communication device notifying the third communication device of a coordinated retransmission of the one or more selected MAC output data units by the first communication device and the third communication device in case of a required retransmission.

24. A non-transitory computer-readable recording medium that stores therein a computer program product, which, when executed by a processor, causes the method according to embodiment 22 or 23 to be performed.

25. A computer program comprising program code means for causing a computer to perform the steps of said method according to embodiment 22 or 23 when said computer program is carried out on a computer.

The invention claimed is:

1. First communication device comprising circuitry configured to:

generate control information for one or more MAC output data units, the control information indicating that the one or more MAC output data units are to be physical (PHY) layer processed by the third communication device and to be transmitted to a second communication device from the third communication device and from the first communication device;

provide the one or more MAC output data units and the associated control information to the third communication device for generation of one or more PHY output data units and storage of the one or more MAC output data units for transmission and possibly required retransmission;

notify the third communication device of a coordinated transmission of the one or more MAC output data units by the first communication device and the third communication device;

generate one or more PHY output data units by performing PHY layer processing of the one or more MAC output data units for transmission to the second communication device from the first communication device in the coordinated transmission with the transmission of one or more PHY output data units generated by the third communication device from the one or more MAC output data units;

transmit one or more PHY output data units generated from the one or more MAC output data units in the coordinated transmission;

notify the third communication device of a coordinated retransmission of one or more selected MAC output data units by the first communication device and the third communication device in case of a required retransmission; and transmit one or more PHY output data units generated from the one or more selected MAC output data units in the coordinated retransmission.

2. First communication device as claimed in claim 1, wherein the circuitry is configured to use a same link between the first communication device and the third communication device for notifying the third communication device of the coordinated transmission and of the coordinated retransmission.

3. First communication device as claimed in claim 1, wherein the circuitry is configured to decide, based on feedback information received from the second communication device and/or the third communication device, if one or more MAC output data units shall be retransmitted and which one or more MAC output data units shall be retransmitted in the coordinated retransmission.

4. First communication device as claimed in claim 1, wherein the circuitry is configured to notify the third communication device of a coordinated transmission by transmitting a transmission trigger and/or announcement comprising one or more of an identifier of the one or more MAC output data units to be used for generating the PHY output data units for transmission to the second communication device by the third communication device in the coordinated transmission, PHY layer configuration information indicating the configuration of PHY layer circuitry of the third communication device used for generating the one or more PHY output data units, spatial mapping information indicating spatial mapping performed by the third communication device used in the coordinated transmission, and stream index information indicating one or more streams served by the third communication device used in the coordinated transmission.

5. First communication device as claimed in claim 1, wherein the circuitry is configured to notify the third communication device of the information that the third communication device has to modify within the one or more MAC output data units and/or subframes in an aggregate MAC output data unit in the coordinated retransmission compared to the previous transmission, and/or to notify the third communication device of a coordinated retransmission by transmitting a retransmission notification indicating that a coordinated retransmission is desired and a retransmission trigger and/or announcement initiating the coordinated retransmission, wherein the retransmission notification and the retransmission trigger and/or announcement are transmitted as separate notifications or as common notification.

6. First communication device as claimed in claim 5, wherein the retransmission notification comprises one or more of the status of feedback information received from the second communication device and/or the third communication device, an identifier of the one or more selected MAC output data units to be used for generating one or more selected PHY output data units for retransmission to the second communication device by the third communication device in the coordinated retransmission, the type of retransmission, modified subfields or information related to these subfields, one or more frame check sequences, padding, delimiters and/or end-of-frame (EOF) information, an identifier of additional MAC output data units to be transmitted in addition to the one or more selected MAC output data units to be retransmitted, and order information indicating the order of subframes of the one or more selected and/or additional MAC output data units within an aggregate MAC output data unit.

7. First communication device as claimed in claim 5, wherein the retransmission trigger and/or announcement comprises one or more of an identifier of the one or more selected MAC output data units to be used for generating one or more selected PHY output data units for retransmission to the second communication device by the third communication device in the coordinated transmission, PHY layer configuration information indicating the configuration of PHY layer circuitry of the third communication device used for generating the one or more selected PHY output data units, spatial mapping information indicating spatial mapping performed by the third communication device used in the coordinated retransmission, and stream index information indicating one or more streams served by the third communication device used in the coordinated retransmission.

8. First communication device as claimed in claim 1, wherein the communication circuitry is configured to signal to the third communication device if and which of the stored MAC output data units can be deleted and/or if retransmitted MAC output data units have been successfully received by the second communication device.

9. First communication device as claimed in claim 1, wherein the control information and/or a MAC output data unit comprises one or more of an identifier of the MAC output data unit, location information indicating i) beginning and end or indicating ii) beginning and length of the MAC output data unit or a subframe within an aggregate MAC output data unit comprising two or more MAC output data units, presence and location of Sequence Control and/or Quality of Service (QoS) Control and/or High Throughput (HT) Control, and a sequence number.

10. Third communication device comprising circuitry configured to;

obtain one or more media access control (MAC) output data units and associated control information from a first communication device, the control information indicating that the one or more MAC output data units are to be physical (PHY) layer processed by the third communication device and to be transmitted to the second communication device from the third communication device and from the first communication device;

store the one or more MAC output data units for transmission and possibly required retransmission until a coordinated retransmission is finished or a predetermined condition is fulfilled;

generate PHY output data units by performing PHY layer processing of the one or more MAC output data units for transmission to the second communication device from the third communication device in a coordinated transmission with the transmission of one or more PHY output data units generated by the first communication device from the one or more MAC output data units;

transmit the one or more PHY output data units in the coordinated transmission in response to a notification from the first communication device notifying the third communication device of the coordinated transmission of the one or more MAC output data units by the first communication device and the third communication device; and transmit one or more PHY output data units generated from one or more selected MAC output data units in a coordinated retransmission in response to a notification from the first communication device notifying the third communication device of a coordinated retransmission of the one or more selected MAC output data units by the first communication device and the third communication device in case of a required retransmission.

11. Third communication device as claimed in claim 10, wherein the circuitry is configured to parse one or more MAC output data units to be retransmitted from the stored MAC output data units based on location information included in the MAC output data units or by use of MAC layer processing of the MAC output data units, and/or to separate, in the parsing operation, within the one or more MAC output data units the MAC output data unit, delimiters and padding fields.

12. Third communication device as claimed in claim 10, wherein the circuitry is configured to modify one or more subfields of the one or more MAC output data units to be retransmitted based on information included in the notification received from the first communication device.

13. Third communication device as claimed in claim 12, wherein the circuitry is configured to recompute a frame check sequence (FCS) of the one or more MAC output data units and/or to copy the FCS from the notification from the first communication device and replace the existing FCS in the one or more MAC output data units by the recomputed or copied FCS.

14. Third communication device as claimed in claim 11, wherein the circuitry is configured to aggregate the parsed and modified MAC output data units, wherein delimiters and/or padding fields taken from parsed MAC output data units are added between subsequent MAC output data units.

15. Third communication device as claimed in claim 14, wherein the circuitry is configured to modify the last padding field according to a received notification and/or to modify the first delimiter to contain only non-duplicated information.

16. Third communication device as claimed in claim 10, wherein the circuitry is configured to delete MAC output data units and/or subframes if one or more of the following conditions is fulfilled:

they have been retransmitted, a notification is received from the first communication device that they can be deleted, a notification is received from the second communication device that they have been successfully received, and a predetermined time duration has passed.

17. Third communication device as claimed in claim 10, wherein the circuitry is configured to store newly obtained MAC output data units by overwriting the oldest stored MAC output data units and/or including multiple MAC output data units into an aggregate MAC output data unit by subframes and storing only the subframes.

18. First communication method of a first communication device, the method comprising:

generating control information for one or more MAC output data units, the control information indicating that the one or more MAC output data units are to be physical (PHY) layer processed by the third communication device and to be transmitted to a second communication device from the third communication device and from the first communication device;

providing the one or more MAC output data units and the associated control information to the third communication device for generation of one or more PHY output data units and storage of the one or more MAC output data units for transmission and possibly required retransmission;

notifying the third communication device of a coordinated transmission of the one or more MAC output data units by the first communication device and the third communication device;

generating one or more PHY output data units by performing PHY layer processing of the one or more MAC output data units for transmission to the second communication device from the first communication device in the coordinated transmission with the transmission of one or more PHY output data units generated by the third communication device from the one or more MAC output data units;

transmitting the one or more PHY output data units generated from the one or more MAC output data units in the coordinated transmission;

notifying the third communication device of a coordinated retransmission of one or more selected MAC output data units by the first communication device and the third communication device in case of a required retransmission; and transmitting one or more PHY output data units generated from the one or more selected MAC output data units in the coordinated retransmission.

19. Third communication method of a third communication device, the method comprising:

obtaining one or more media access control (MAC) output data units and associated control information from a first communication device, the control information indicating that the one or more MAC output data units are to be physical (PHY) layer processed by the third communication device and to be transmitted to the second communication device from the third communication device and from the first communication device;

storing the one or more MAC output data units for transmission and possibly required retransmission until a coordinated retransmission is finished or a predetermined condition is fulfilled;

generating PHY output data units by performing PHY layer processing of the one or more MAC output data units for transmission to the second communication device from the third communication device in a coordinated transmission with the transmission of one or more PHY output data units generated by the first communication device from the one or more MAC output data units;

transmitting the one or more PHY output data units in the coordinated transmission in response to a notification from the first communication device notifying the third communication device of the coordinated transmission of the one or more MAC output data units by the first communication device and the third communication device; and transmitting one or more PHY output data units generated 5 from one or more selected MAC output data units in a coordinated retransmission in response to a notification from the first communication device notifying the third communication device of a coordinated retransmission of the one or more selected MAC output data units by 10 the first communication device and the third communication device in case of a required retransmission.

20. A non-transitory computer-readable recording medium that stores therein a computer program product, which, when executed by a processor, causes the method 15 according to claim 18 to be performed.

\* \* \* \* \*